US011780575B2

(12) United States Patent
Brunetti et al.

(10) Patent No.: US 11,780,575 B2
(45) Date of Patent: Oct. 10, 2023

(54) HELICOPTER WITH AN ANTI-TORQUE SYSTEM

(71) Applicant: LEONARDO S.P.A., Rome (IT)

(72) Inventors: Massimo Brunetti, Samarate (IT); Luigi Maria Bottasso, Samarate (IT); Chee Su Goh, Samarate (IT); Gary Weller, Samarate (IT)

(73) Assignee: LEONARDO S.P.A., Rome (IT)

(*) Notice: Subject to any disclaimer, the term of this patent is extended or adjusted under 35 U.S.C. 154(b) by 426 days.

(21) Appl. No.: 16/765,318

(22) PCT Filed: Dec. 21, 2018

(86) PCT No.: PCT/IB2018/060525
§ 371 (c)(1),
(2) Date: May 19, 2020

(87) PCT Pub. No.: WO2019/123419
PCT Pub. Date: Jun. 27, 2019

(65) Prior Publication Data
US 2020/0385112 A1 Dec. 10, 2020

(30) Foreign Application Priority Data
Dec. 22, 2017 (EP) .................................... 17210094

(51) Int. Cl.
*B64C 27/82* (2006.01)
*B64C 27/08* (2023.01)
(Continued)

(52) U.S. Cl.
CPC .............. *B64C 27/82* (2013.01); *B64C 27/08* (2013.01); *B64C 27/14* (2013.01);
(Continued)

(58) Field of Classification Search
CPC ......... B64C 27/82; B64C 27/08; B64C 27/14; B64C 2027/8227; B64C 2027/8254;
(Continued)

(56) References Cited

U.S. PATENT DOCUMENTS 3,957,226 A * 5/1976 Daggett, Jr ............. B64C 27/82
244/17.19
5,102,067 A * 4/1992 Weiner .................... B64C 27/82
244/17.19
(Continued)

FOREIGN PATENT DOCUMENTS

CA 2794077 6/2013
CN 107 399 431 11/2017
(Continued)

OTHER PUBLICATIONS

Coptaire, "3D printed Propeller Shroud Kit—DIY Drones", Apr. 7, 2012, Created by Chris Andersen.
(Continued)

*Primary Examiner* — Valentina Xavier
(74) *Attorney, Agent, or Firm* — Leason Ellis LLP

(57) ABSTRACT

An anti-torque system (10) for a helicopter (1) is described that comprises: an electric power supply unit (15); at least one first rotor (17), operatively connected to an electric power supply unit (15) and operable by the electric power supply unit (15) so as to rotate with a first variable angular speed; and at least one second rotor (25) operatively connected to electric power supply unit (15) and operable by the electric power supply unit (15) so as to rotate with a second variable angular speed.

31 Claims, 15 Drawing Sheets

(51) Int. Cl.
*B64C 27/14* (2006.01)
*B64D 27/02* (2006.01)
*B64U 10/10* (2023.01)

(52) U.S. Cl.
CPC .............. *B64C 2027/8227* (2013.01); *B64C 2027/8254* (2013.01); *B64D 2027/026* (2013.01); *B64U 10/10* (2023.01)

(58) Field of Classification Search
CPC ...... B64C 2201/024; B64C 2027/8209; B64C 27/12; B64D 2027/026; B64D 27/24; Y02T 50/40; Y02T 50/60
See application file for complete search history.

(56) References Cited

U.S. PATENT DOCUMENTS

| | | | |
|---|---|---|---|
| 5,240,205 A | 8/1993 | Allongue | |
| 5,566,907 A | 10/1996 | Marze et al. | |
| 9,296,477 B1 | 3/2016 | Coburn | |
| 2009/0140095 A1* | 6/2009 | Sirohi | B64C 29/00 244/17.11 |
| 2013/0147204 A1 | 6/2013 | Botti et al. | |
| 2014/0283519 A1* | 9/2014 | Mariotto | F02C 7/36 60/698 |
| 2015/0184639 A1* | 7/2015 | Goessling | H02J 3/382 290/55 |
| 2017/0113793 A1* | 4/2017 | Toulmay | B64C 27/22 |
| 2017/0225573 A1* | 8/2017 | Waltner | B60L 50/16 |
| 2017/0349273 A1 | 12/2017 | Parsons et al. | |
| 2017/0349274 A1* | 12/2017 | Fenny | B64C 27/04 |
| 2017/0349276 A1 | 12/2017 | Fenny | |
| 2018/0009542 A1* | 1/2018 | Kuster | B64D 35/02 |
| 2018/0170537 A1* | 6/2018 | Hachtmann | B64C 39/022 |
| 2020/0023958 A1* | 1/2020 | Acee | B64C 27/82 |
| 2021/0163127 A1* | 6/2021 | Bustamante | B64C 27/82 |

FOREIGN PATENT DOCUMENTS

| | | | |
|---|---|---|---|
| DE | 10 2010 021026 | 11/2011 | |
| EP | 2631174 | 8/2013 | |
| EP | 2821344 | 1/2015 | |
| EP | 3 254 962 | 12/2017 | |
| FR | 3037733 A1 * | 12/2016 | ............ B60R 16/03 |
| JP | 2009 090755 | 4/2009 | |

OTHER PUBLICATIONS

Chinese Office Action in CN Application No. 2018800798198, dated Dec. 13, 2022, an English translation attached hereto. (14 pages).

* cited by examiner

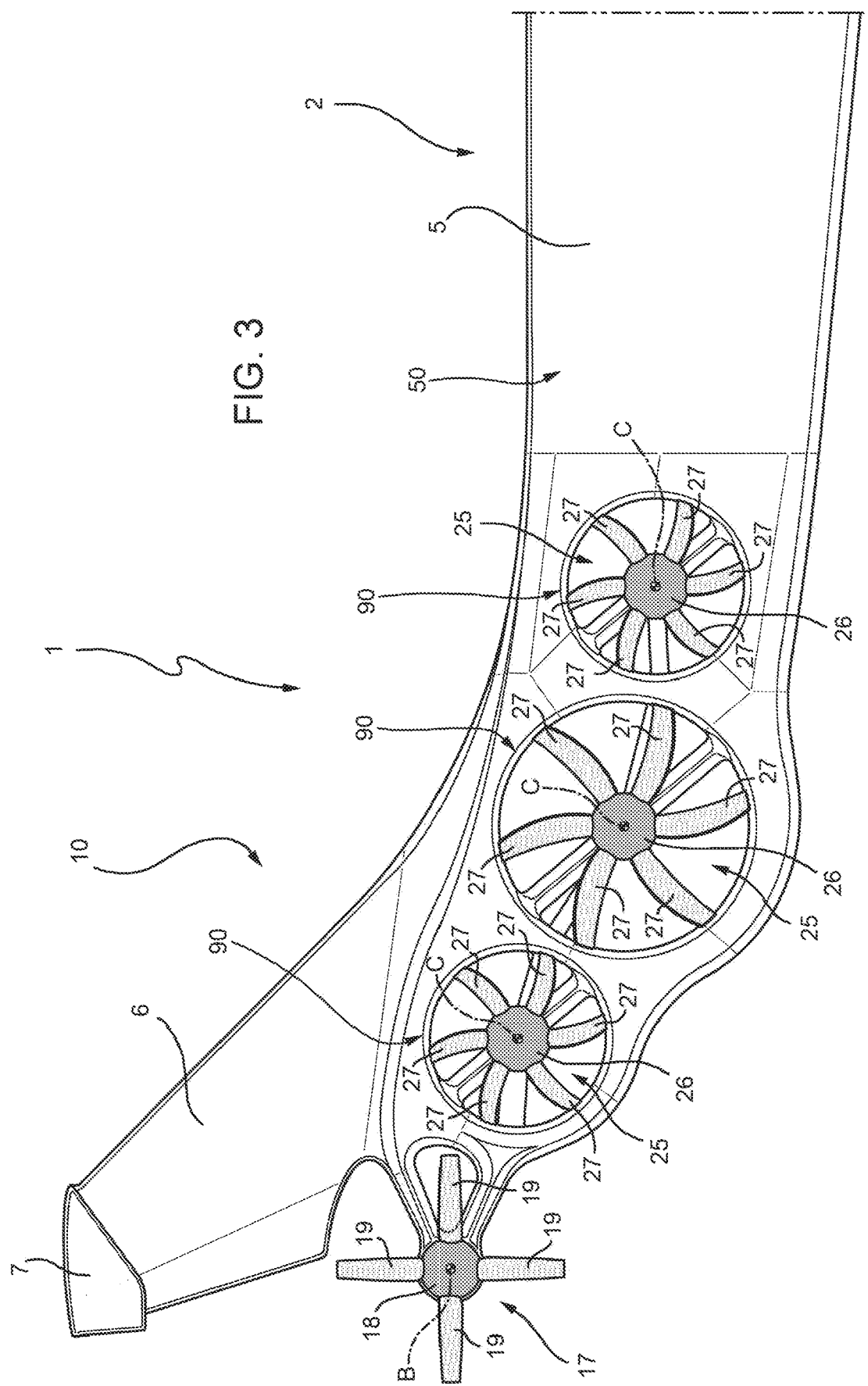

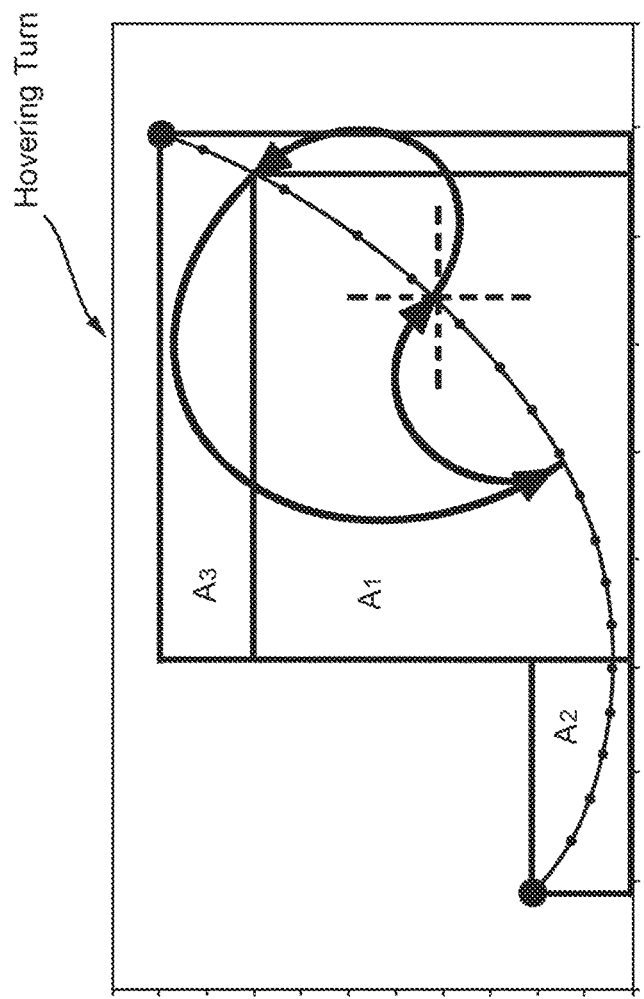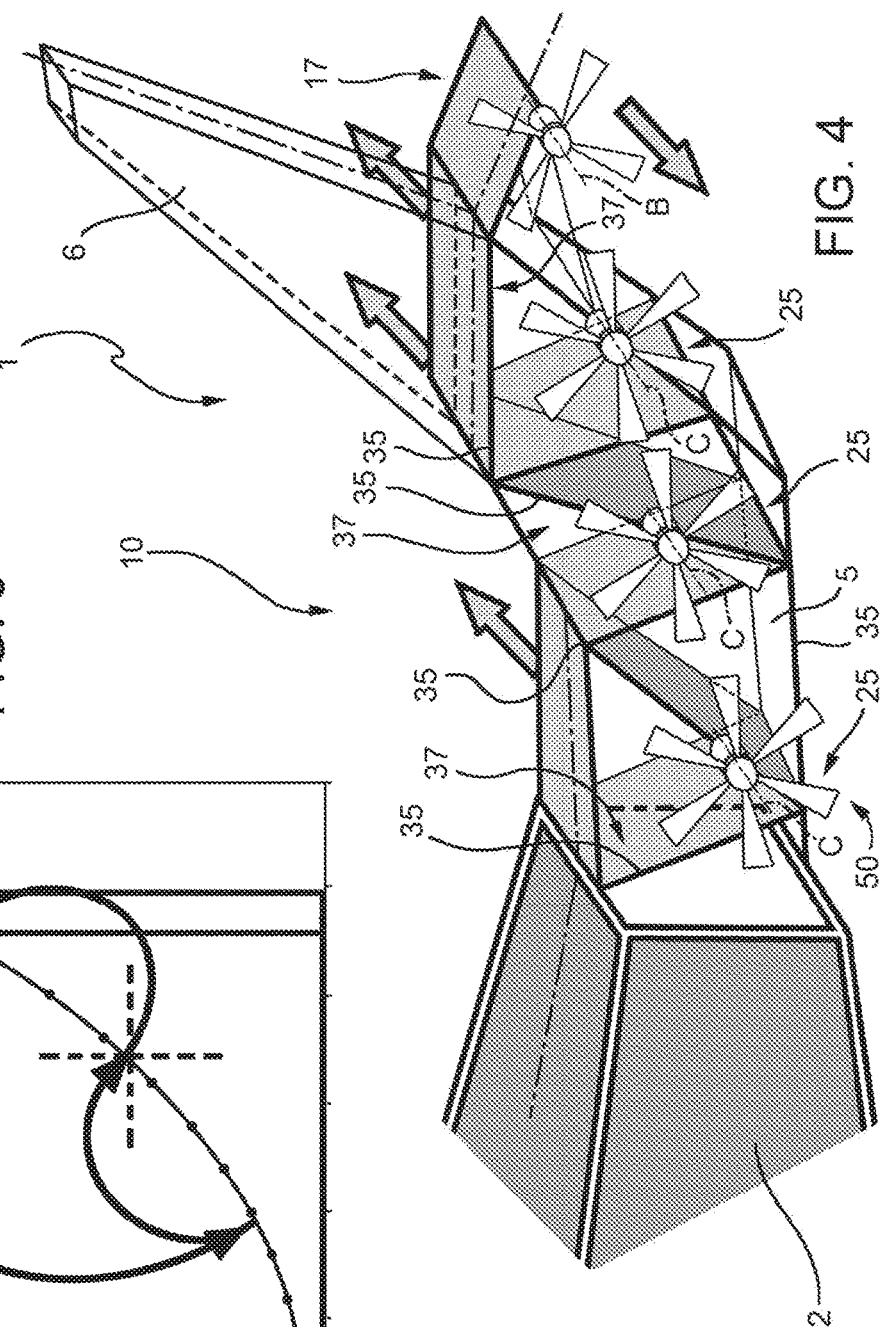

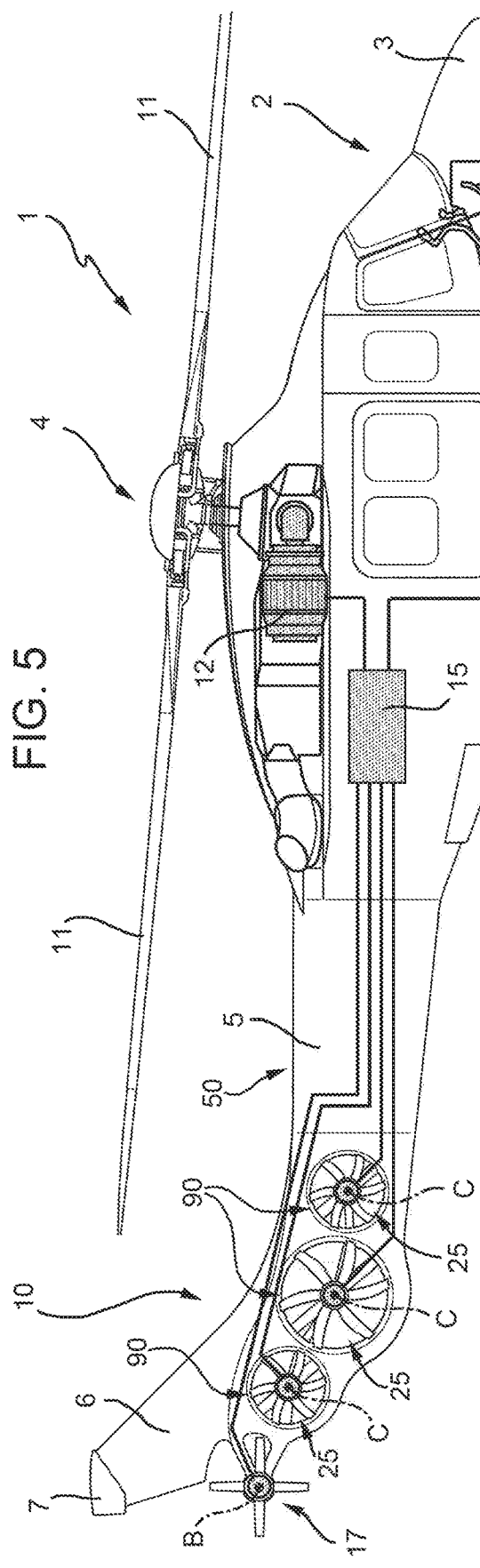
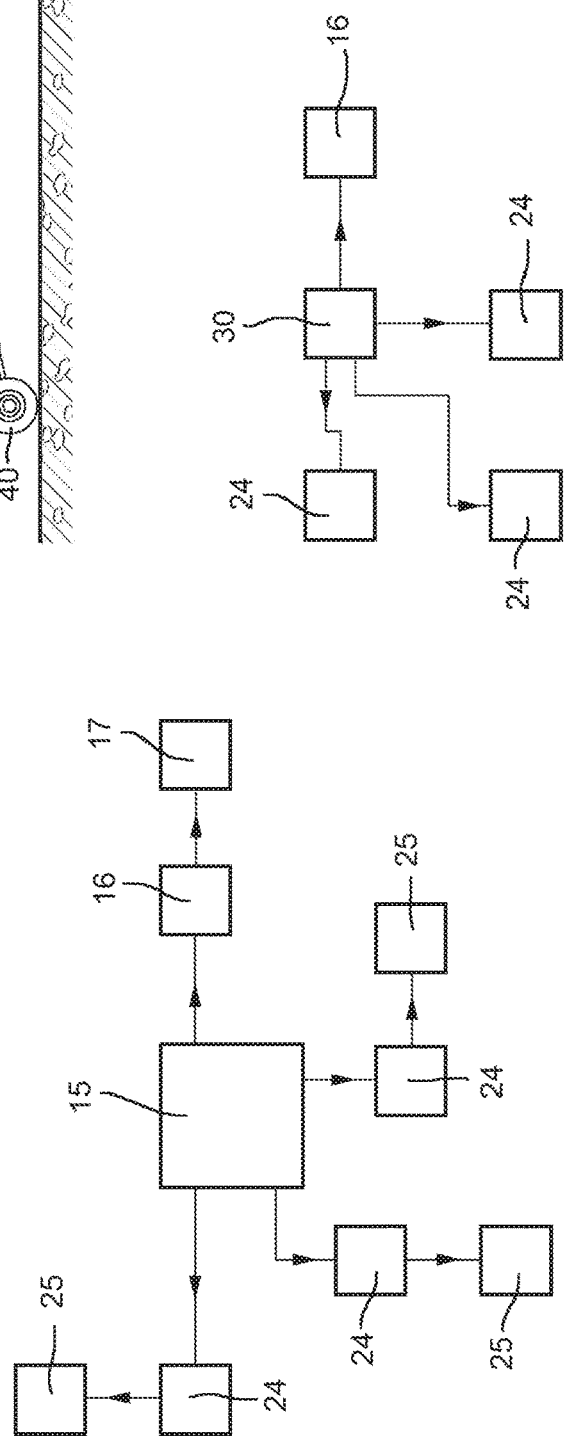
FIG. 5

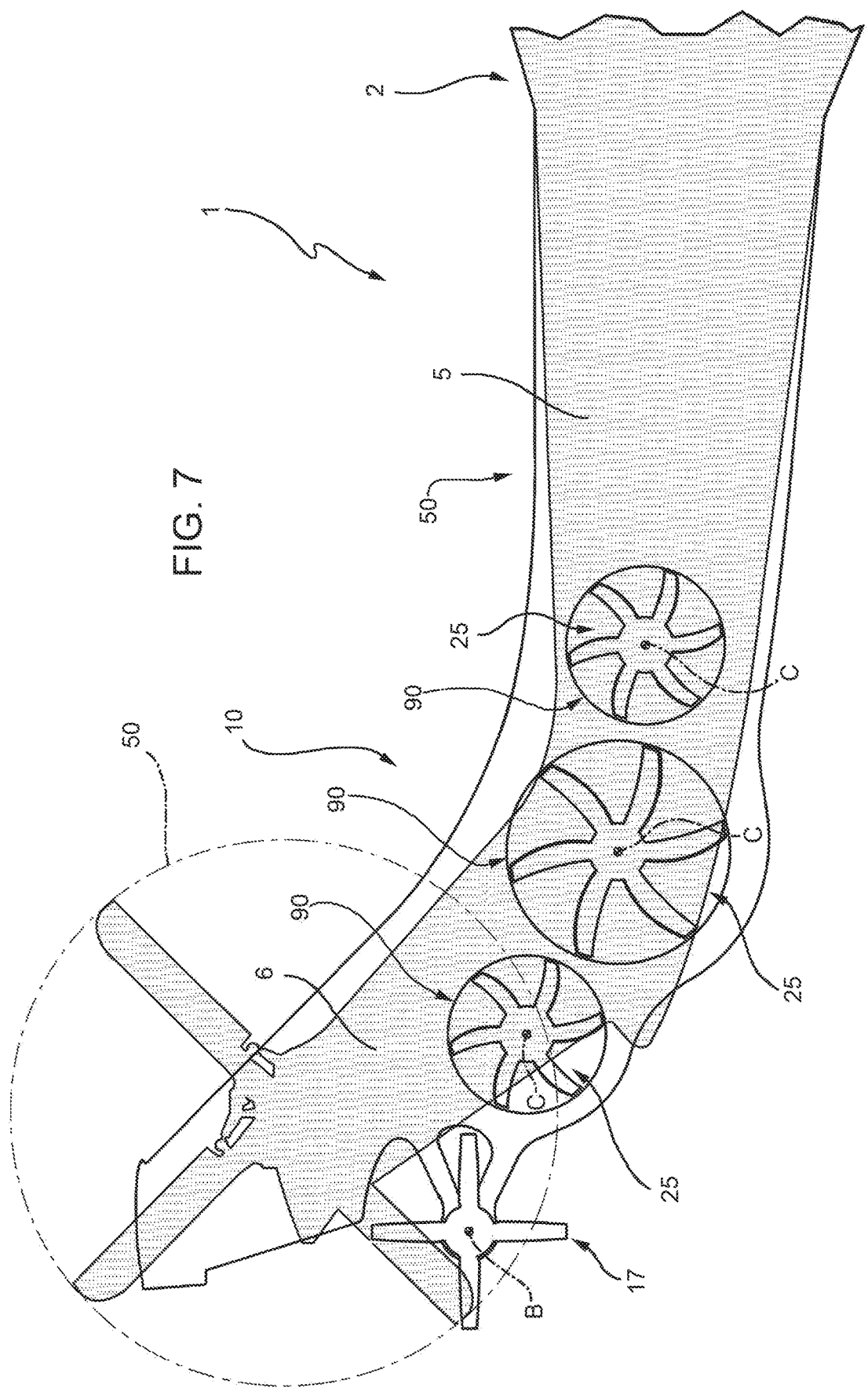

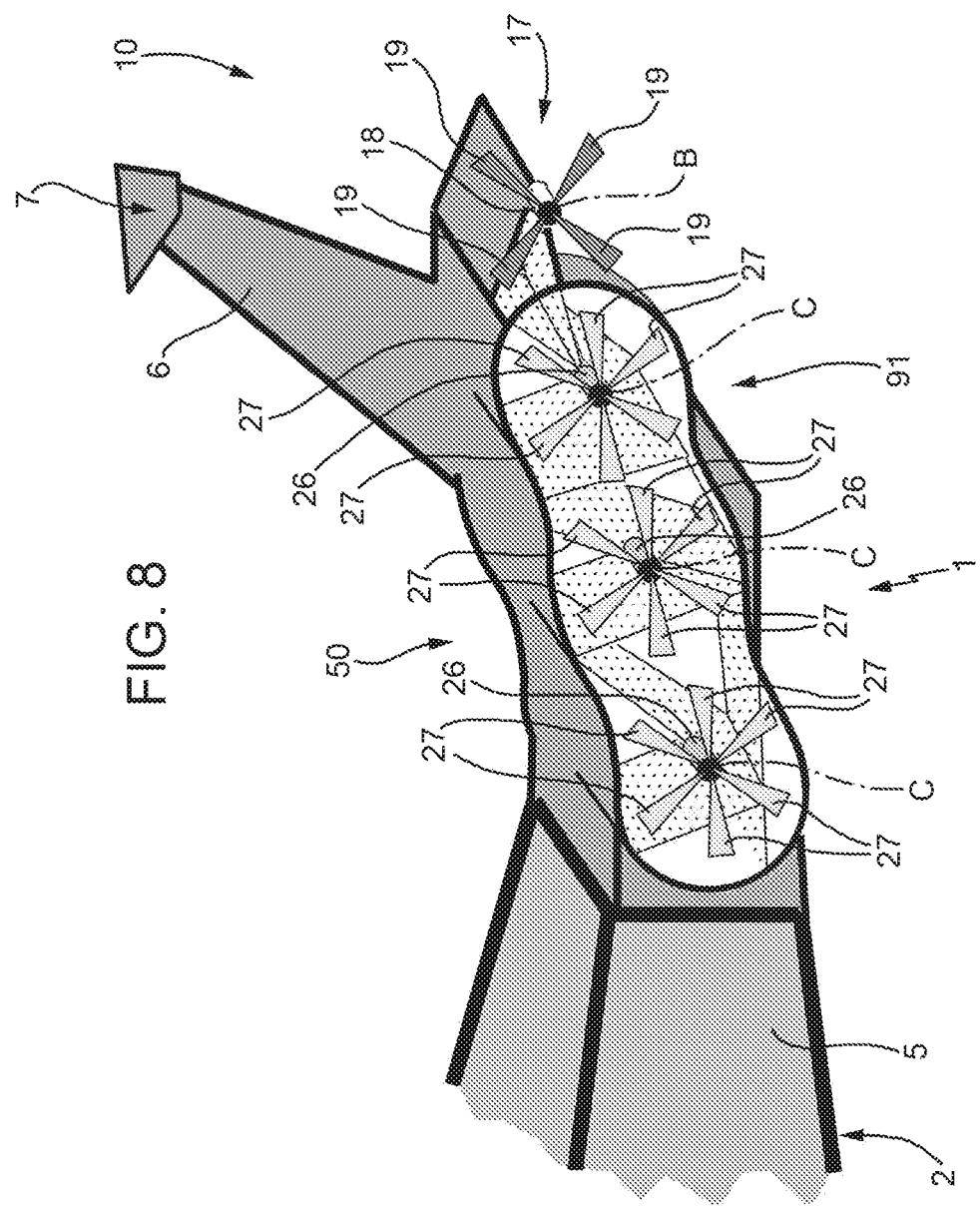

HELICOPTER WITH AN ANTI-TORQUE SYSTEM

CROSS-REFERENCE TO RELATED APPLICATIONS

This patent application is a U.S. National Phase Application under 35 U.S.C. § 371 of International Patent Application No. PCT/IB2018/060525, filed on Dec. 21, 2018, which claims priority from European patent application no. 17210094.3 filed on Dec. 22, 2017, all of which are incorporated by reference, as if expressly set forth in their respective entireties herein.

TECHNICAL FIELD

The present invention relates to an anti-torque system for a helicopter.

BACKGROUND ART

Helicopters basically comprise, in a known manner, a fuselage, a main rotor positioned on the top portion of the fuselage and rotating about a first axis, and an anti-torque rotor located at a tail end of the helicopter and rotating about a second axis, transversal to the first axis.

The main rotor has the function of generating the lift necessary to support the helicopter, to enable varying the altitude of the helicopter and to enable the forward/backward and lateral movement of the helicopter.

As is known, the main rotor exerts a first torque in a first direction on the fuselage of the helicopter. This first torque would tend to cause rotation of the fuselage in the first direction.

The anti-torque rotor is provided to generate a second torque on the fuselage in the same or different direction to the first torque, so as to control the helicopter's yaw angle.

In this way, the anti-torque rotor prevents undesired rotation of the helicopter and enables controlling the yaw angle, namely the angle of rotation defined with respect to a vertical axis passing through the centre of gravity of the helicopter, with reference to a hovering flight condition of the helicopter.

The anti-torque rotor comprises, in a known manner, a hub rotatable about a respective axis and a plurality of blades projecting in a cantilever fashion from the hub.

In the traditional solutions, the helicopter comprises:
one or more combustion engines (e.g. turbine engines);
a main transmission unit, which is interposed between the turbines and the main rotor; and
a secondary transmission unit, which is driven by the main transmission unit and transfers drive to the hub and the blades of the anti-torque rotor.

In the traditional solution, the helicopter further comprises a fin projecting from an aft end of a tail boom and a tailplane projecting in cantilever fashion from both sides of the fin.

The tail boom is a structural element which sustains the loads generated by the anti-torque rotor and, in addition, the stress shear and the bending moment generated by the tailplane and the fin.

The anti-torque rotor normally protrudes from a lateral side of the fin. Accordingly, the secondary transmission unit passes through the tail boom and the fin.

The fin allows to further control the yaw of the helicopter especially in forward flight. This additional yaw control is helpful in case of breakdown of the main rotor and allows the pilot to mitigate the counter-rotation of the fuselage during emergency landing.

If positioned at the top end of the fin, the tailplane is only marginally impinged by the wake of the main rotor. Accordingly, the generation of noise and vibrations is reduced with special reference to the transition from hovering to forward flight.

However, the design of the fin is constrained by the fact that the fin accommodates part of the secondary transmission unit.

In consequence, in the above-described solution, the rotational speed of the hub and the blades of the tail rotor is inevitably associated with the rotational speed of the main rotor which results in a sub-optimal use of the anti-torque system.

The blades are hinged to the hub of the anti-torque rotor so that the associated pitch angle can be varied.

In this way, it is possible to control the traction generated by the anti-torque rotor, and therefore the yaw angle of the helicopter, independently of the lift generated by the main rotor. The same mechanism also allows modulating the traction of the tail rotor depending on the flight condition, for example, maximizing it in hovering and minimizing it in high-speed translational flight, a condition in which the anti-torque function is largely performed by aerodynamic forces.

The use of electric motors has recently been proposed for driving the anti-torque rotor in rotation.

For example, patent EP-B-2631174 describes using an electric motor for driving the anti-torque rotor, so as to be able to vary the hub's angular speed and the blades' pitch angle independently of each other and independently of the rotational speed of the main rotor.

EP-A-3254962 discloses a helicopter with a fuselage, a tail boom and an anti-torque matrix arranged on the opposite side of tail boom with respect to the fuselage.

The anti-torque matrix comprises a plurality of independently actuatable second rotors.

Furthermore, the helicopter disclosed in EP-A-3254962 comprises a pair of lateral stabilizers, which laterally project from the tail boom.

These lateral stabilizers increase the transversal cross-section and the weight of the helicopter. Furthermore, due to their position, the stabilizers are impinged by the wake generated by the main rotor. This is a fact that can lead to vibrations and noise or—if the stabilizers are stretched out—to a further increase in the helicopter cross-section and weight.

In this arrangement, the anti-torque matrix is not subjected to the bending moment and shear stress induced by the stabilizers.

In other words, the anti-torque matrix is only subjected to the loads generated by itself and the essentially defines only a protection for the rotors.

EP-A-3254962 also discloses an electric distributed system for the anti-torque system comprising:
two or more generators connected to a main gearbox transmission;
a first and a second plurality of variable speed motors connected to the two or more generators; and
at least one first and one second yaw control computer independently connected to each of the first and the second plurality of variable speed motors, wherein each of the first and the second yaw control computer serves as a primary and a backup yaw control computer to provide redundancy control to both the first and second plurality of variable speed motors.

There is awareness in the industry of the need to ensure a certain level of redundancy in the anti-torque system, without penalising the capability of controlling the desired yaw angle of the helicopter in each operating condition, while improving the overall aerodynamic design of the tail and, therefore, the overall aerodynamic efficiency of the helicopter.

There is awareness in the industry of the need to ensure a certain level of redundancy in the anti-torque system, without penalising the capability of controlling the desired yaw angle of the helicopter in each operating condition, while reducing as far as possible at the same time the cross section—and, therefore, the overall drag—and the weight of the helicopter.

There is also awareness in the industry of the need to reduce the overall weight of the anti-torque system for the same control capability regarding the yaw angle, disc loading, and maximum blade tip speed, while reducing as far as possible at the same time the cross section and the weight of the helicopter.

Furthermore, there is also awareness in the industry of the need to adjust and control the yaw angle, simplifying the constructional solution of known types of anti-torque rotors, while reducing as far as possible at the same time the cross section and the weight of the helicopter.

Finally, there is a need in the industry to ensure a certain level of redundancy in the anti-torque system while preserving the structural function of the tail boom.

U.S. Pat. No. 9,296,477 describes a multi-rotor helicopter.

CA-2794077 and EP-A-2821344 describe an electrically powered anti-torque rotor.

DISCLOSURE OF INVENTION

The object of the present invention is to produce a helicopter that enables satisfying at least one of the aforementioned needs associated with known types of anti-torque rotors.

The aforementioned object is achieved by the present invention, in so far as it relates to a helicopter according to claim 1.

The present invention also relate to a helicopter according to claim 20.

BRIEF DESCRIPTION OF THE DRAWINGS

For a better understanding of the present invention two preferred embodiments are described hereinafter, purely by way of a non-limitative example and with reference to the accompanying drawings, in which:

FIG. 3 shows an enlarged view of a tail portion of the helicopter with the anti-torque system in FIGS. 1 and 2;

FIG. 4 shows an enlarged view of the anti-torque system in FIG. 3 with parts removed for the sake of clarity;

FIG. 5 shows the helicopter in FIGS. 1 and 2 with parts removed for the sake of clarity;

FIG. 6 is a diagram that illustrates the functioning of the anti-torque system according to the invention in different operating conditions of the helicopter in FIGS. 1 to 5, and compares it with the functioning of an anti-torque system of a known type providing the same power;

FIG. 7 compares the space occupied by the anti-torque system according to the present invention with that of an anti-torque system of a known type capable of providing the same traction;

FIG. 8 is a perspective view of a helicopter equipped with a second embodiment of an anti-torque system according to the present invention;

BEST MODE FOR CARRYING OUT THE INVENTION

Figure 1:
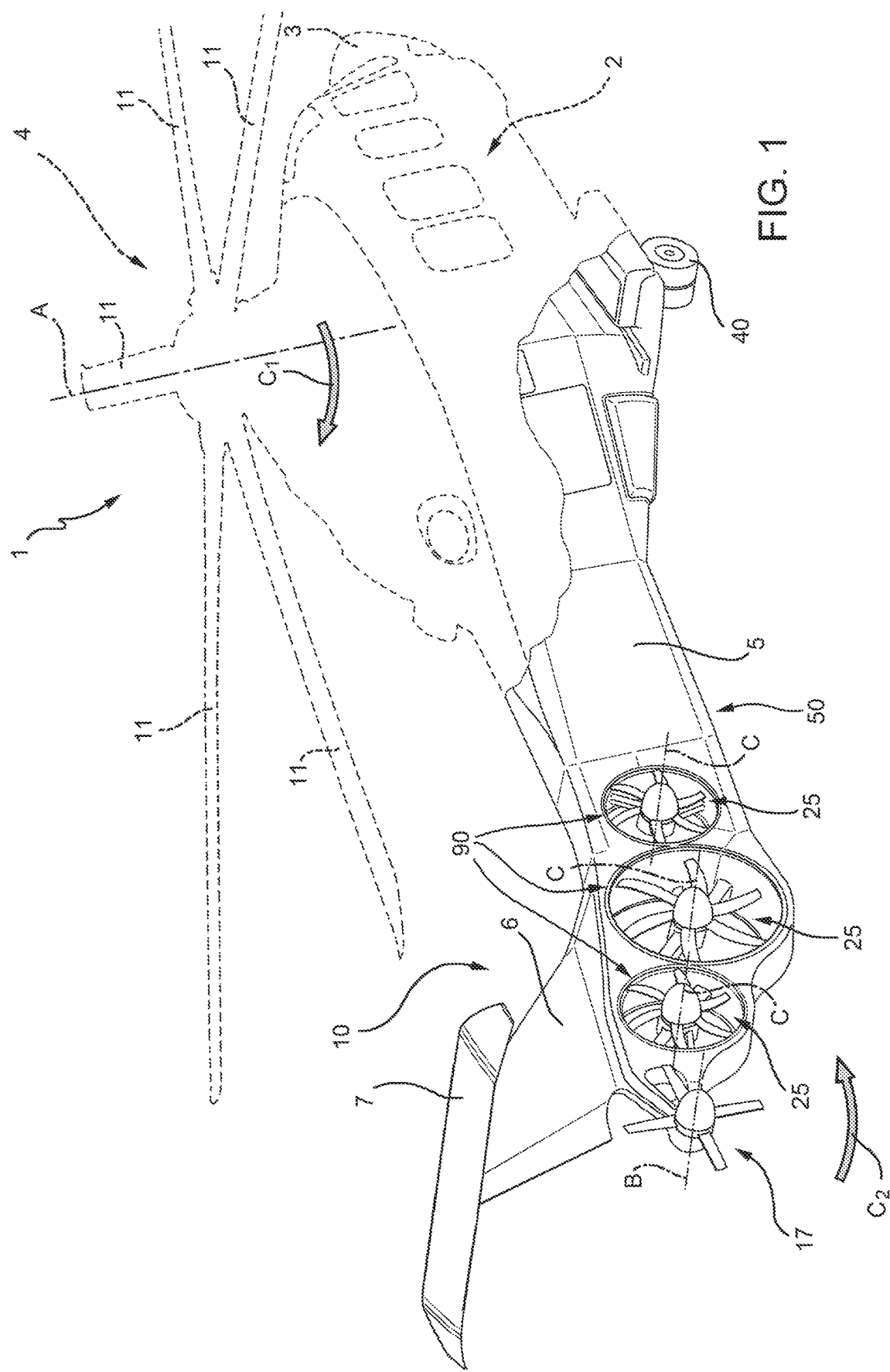
FIG. 1 is a perspective view of a helicopter equipped with a first embodiment of an anti-torque system according to the present invention.

With reference to the accompanying drawings, reference numeral 1 indicates a helicopter.

In this description, the terms "higher", "lower", "vertical" and similar hereinafter refer to a condition in which the helicopter 1 is on the ground.

The helicopter 1 basically comprises:
a fuselage 2 with a nose 3 located at the front;
a drive unit 12;
a main rotor 4 equipped with a plurality of blades 11 positioned on the top of the fuselage 2, driven by the drive unit 12 and rotatable about an axis A;
a tail portion 5 located at the opposite end of the fuselage 2 with respect to the nose 3 and comprising a fin 6 and a tailplane 7 projecting in a cantilever fashion on both sides of the fin 6; and
an anti-torque system 10 carried by the tail portion 5.

Still more precisely, tail portion 5 comprises a tail boom 50. Fin 6 is arranged at an aft end of tail boom 50 and tailplane 7 laterally extend from both sides of the fin 6.

In the embodiment shown, tailplane 7 extends from both sides of a top portion of the fin 6.

It is important to notice that the expression "tail boom" is intended to indicate in the present description a structural beam capable of supporting the shear stress and the bending moments generated by the rotors, the fin 6 and tailplane 7.

In the context of the present description the tail boom is also acting as a shroud for protection of the rotors.

As is known, the operation of rotor 4 enables controlling the lift acting on the helicopter 1 and consequently to vary the altitude of the helicopter 1.

The blades 11 are hinged in the known manner so that the inclination of the rotor disc can be varied, i.e. of the ideal disc defined by the free tips of the blades 11 opposite to axis A.

In this way, rotor 4 controls the forward/backward and lateral movement of the helicopter 1.

The rotation of the blades 11 about axis A causes application of a first torque C1 on the fuselage 2. This first torque C1 would tend to cause rotation of the helicopter 1 about axis A.

The anti-torque system 10 is provided to generate a second torque C2 of adjustable modulus and having a main component in the direction opposite to the first torque C1, so as to be able to control the yaw angle of the helicopter 1.

When the main component of this second torque C2 has the same modulus as the first torque C1, the anti-torque system 10 prevents rotation of the helicopter 1 about axis A.

When the main component of this second torque C2 has a lower or higher modulus than the first torque C1, the anti-torque system 10 causes a change in the yaw angle of the helicopter 1, i.e. rotation of the helicopter 1 with respect to a vertical yaw axis passing through the centre of gravity of the helicopter 1.

As evident hereafter in this description, in certain manoeuvres that must be performed particularly fast, the anti-torque system 10 generates a second torque C2 in the same direction as the first torque C1, so as to quickly turn the helicopter 1 in the same direction as the first torque C1.

Advantageously, the anti-torque system 10 is defined by tail boom 50 and comprises:
- an electric power supply unit 15;
- an electric motor 16 powered by the power supply unit 15 (only schematically shown in FIG. 5); and
- a rotor 17 operatively connected to the motor 16 and driven by the motor 16 (only schematically shown in FIG. 5).

The power supply unit 15 might comprise an electricity generating operatively connected to the drive unit 12, or might comprise a plurality of batteries, or could be any source whatsoever of electrical energy.

In particular, the power supply unit 15 and the rotor 17 could be connected so as to permit a two-way flow of electrical energy/power.

The rotor 17 basically comprises a hub 18 rotatable about an axis C and a plurality of blades 19 projecting from the hub 18 along respective directions transversal to axis B.

The electric motor 16 controls the angular speed of the rotor 17.

In the case shown, the pitch angles of the blades 18 are fixed.

In consequence, in the case shown, the force generated by the rotor 17 on the fuselage 2 along the corresponding axis B, and consequently also the third torque, are adjusted by controlling just the angular speed of the rotor 17.

Anti-torque system 10 also comprises a plurality of rotors 25, three in the case shown, operatively connected to the power supply unit 15 so as to rotate with respective variable speeds with respect to the corresponding axes B.

The anti-torque system 10 also comprises a plurality of electric motors 24 (only schematically shown in FIG. 5) driven by the power supply unit 15 and operatively connected to respective rotors 25 to drive them in rotation with respective angular speeds about the corresponding axes C.

In turn, each rotor 25, comprises:
- a hub 26 rotatable about the corresponding axis C; and
- a plurality of blades 27 projecting from the hub 26 along respective directions transversal to the corresponding axis C.

In the case shown, the pitch angles of the blades 27 are fixed.

In consequence, in the case shown, the forces generated by rotors 25 on the fuselage 2 along the corresponding axes C, and consequently also the fourth torque, are adjusted by controlling just the angular speeds of rotors 25.

In greater detail, rotors 25 are ducted.

Figure 2:
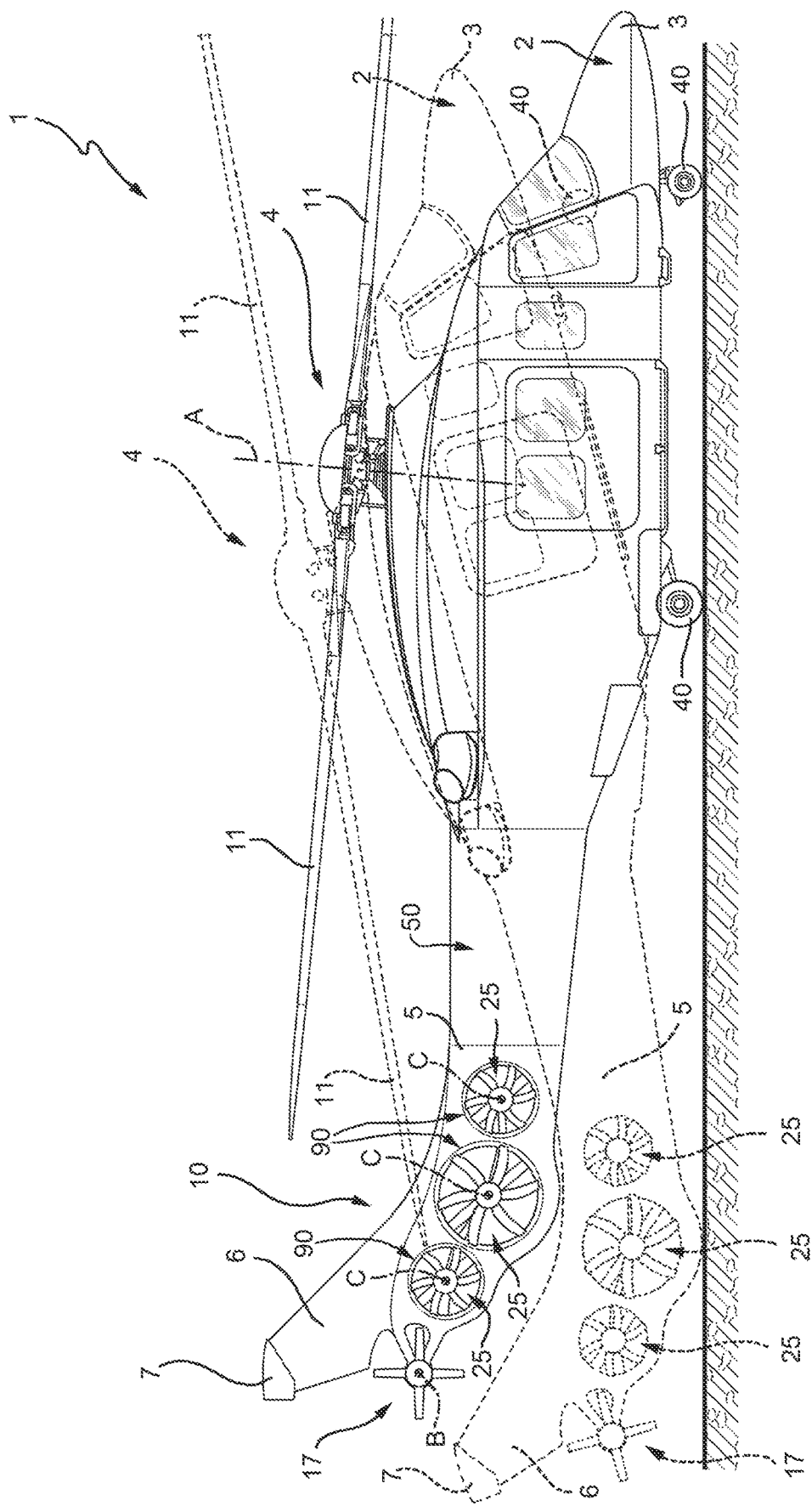
FIG. 2 is a side view of the helicopter in FIG. 1 during a landing manoeuvre.

With reference to FIGS. 1 to 3, helicopter 1 comprises a plurality of ducts 90 for respective rotors 25. In other words, each rotor 25 has a relative duct 90.

With reference to FIG. 8, helicopter 1 comprises a single common duct 91 for all rotors 25.

Furthermore, anti-torque system 10 is integral with and fixed to tail boom 50.

Still more precisely, the rotor disks of rotors 25 are contained inside tail boom 50.

The helicopter 1 also comprises a control unit 30 functionally connected to the power supply unit 15 and programmed to control the rotational speeds of rotors 17 and 25.

In particular, the power supply unit 15 controls the torque and speed of the electric motors 16 and 24.

In greater detail, it is possible identify the following operating conditions of the helicopter 1:
- a normal operating condition (indicated by area A1 in FIG. 6), in which the first torque C1 is lower than a threshold value and must be countered by the anti-torque system 10 with a second torque C2, which is also lower than a threshold value, in order to achieve the desired yaw angle;
- an operational boundary condition (indicated by area A3 in FIG. 6), in which the first torque C1 is higher than the threshold value and must be countered by the anti-torque system 10 with a second torque C2, which is also higher than the threshold value, in order to achieve the desired yaw angle; and
- a further condition (indicated by area A2 in FIG. 6), in which it is necessary to turn the helicopter 1 very quickly in the direction of application of the first torque C1 on the fuselage 2, in order to achieve the desired yaw angle.

The control unit 30 is programmed to:
- cause rotation of rotors 17 and 25 in mutually opposite first and second directions, respectively, in the aforementioned normal operating condition of the helicopter 1;
- cause rotation of rotor 17 also in the second direction, in the aforementioned operational boundary condition of the helicopter 1; and
- accelerate rotor 17 in the first direction and slow down or even stop rotors 26 in the second direction, in the aforementioned further condition in which it is necessary to turn the helicopter 1 very quickly in the direction of application of the first torque C1 on the fuselage 2.

More specifically, the fourth torque generated by the rotation of rotors 25 in the second direction opposes, direction-wise, the first torque C1 generated on the fuselage 2 by rotor 4.

Referring to FIG. 6, the functioning of the anti-torque system 10 in the aforementioned operating conditions is compared with the functioning of a traditional type of anti-torque system with a single rotor with blades having a variable pitch angle and which applies the same power value on the fuselage 2.

FIG. 6 specifies the pitch angle of the blades of the single rotor of the traditional type of anti-torque system on the abscissa and the power it delivers on the ordinate.

In consequence, FIG. 6 indicates the course of the modulus of the second torque C2 developed by the system for the operating conditions of the helicopter 1, indicated by A1, A2 and A3.

In addition, FIG. 6 shows that the same operating conditions are also achievable with the anti-torque system 10 according to previously specified modes.

FIG. 6 also indicates how the so-called hovering turn manoeuvre can be achieved with the anti-torque system 10 by controlling rotors 17 and 25 as previously indicated with reference to the normal operating condition (area A1) and the operational boundary condition (area A3).

The term "hovering turn" means a manoeuvre of the helicopter 1 in hovering flight conditions during which the nose 3 is rotated, for example, by 360 degrees in a clockwise or anticlockwise direction.

It is important to emphasize that the fourth torque generated by the rotation of rotors 25 is generally different in modulus from the first torque C1 generated on the fuselage 2 by rotor 4.

In the case shown, the motors 16 and 24 are connected directly to the respective rotors 17 and 25.

In other words, no gearbox is provided between the motors 16 and 24 and the respective rotors 17 and 25 for changing the transmission ratio between the motors 16 and 24 and the respective rotors 17 and 25.

Referring to FIG. 4, the tail portion 5 comprises:
a plurality of walls 35, which support rotors 17 and 25; and
a plurality of openings 37, delimitated by the walls 35, crossing through the tail portion 5 and arranged at respective intake areas 38 of rotors 17 and 25.

In particular, the walls 35 lay on respective planes transversal to the axes B and C of rotors 17 and 25.

The openings 37 are pass-through parallel to the axes B and C.

Due to the presence of the openings 37, the tail portion 5 does not interfere with fresh air being sucked by rotors 17 and 25.

With reference to the accompanying drawings, rotor 17 is arranged at an end of the tail portion 5 opposite to the fuselage 2.

Rotors 25 are interposed between the fuselage 2 and rotor 17.

Preferably, rotors 25 are ducted inside the tail portion 5 so that the blades 27 do not protrude outside the tail portion 5.

In one embodiment, the supports of rotors 25 also perform a structural part in the transfer of the loads acting on the tail portion 5.

In a further embodiment, rotors 17 and 25 are arranged so as to generate respective forces on the fuselage 2 also having respective vertical components.

With reference to FIGS. 9 to 16, helicopter 1 comprises:
a pair of power plants 100 (only schematically shown);
a main gearbox 101 (only schematically shown), which drives in rotation main rotor 4; and
a pair of free-wheels 152 which are interposed between respective power plants 100 and main gearbox 101.

Furthermore, helicopter 1 comprises:
a basic distribution grid 102 (only schematically shown), which is provided to electrically feed low power electrical loads 150, e.g. avionics load; and
an auxiliary distribution grid 103 (only schematically shown), which is provided to electrically feed high power electrical loads 151, e.g. some actuators of the blades of rotors 25.

Figure 9:
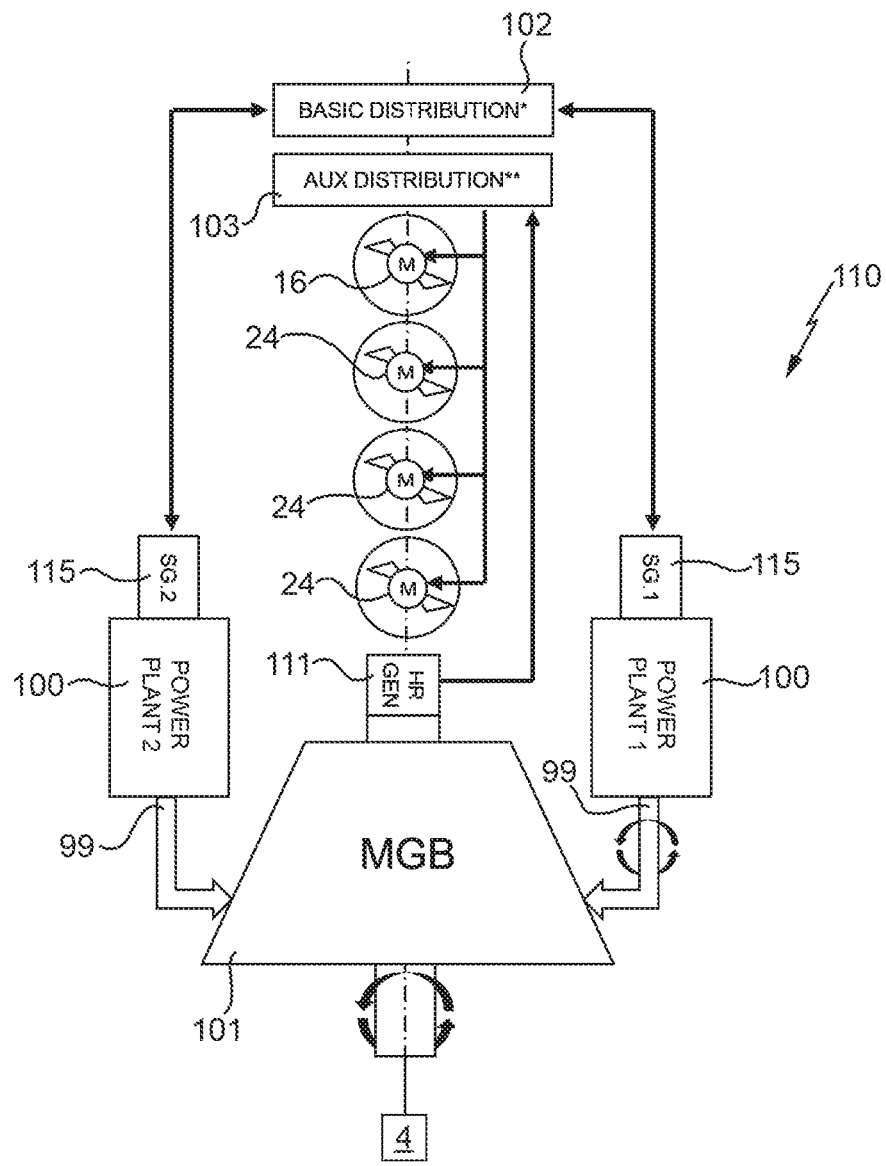
FIG. 9 is a schematic view of a first embodiment of a propulsive unit for the anti-torque system of FIGS. 1 to 8.
Figure 10:
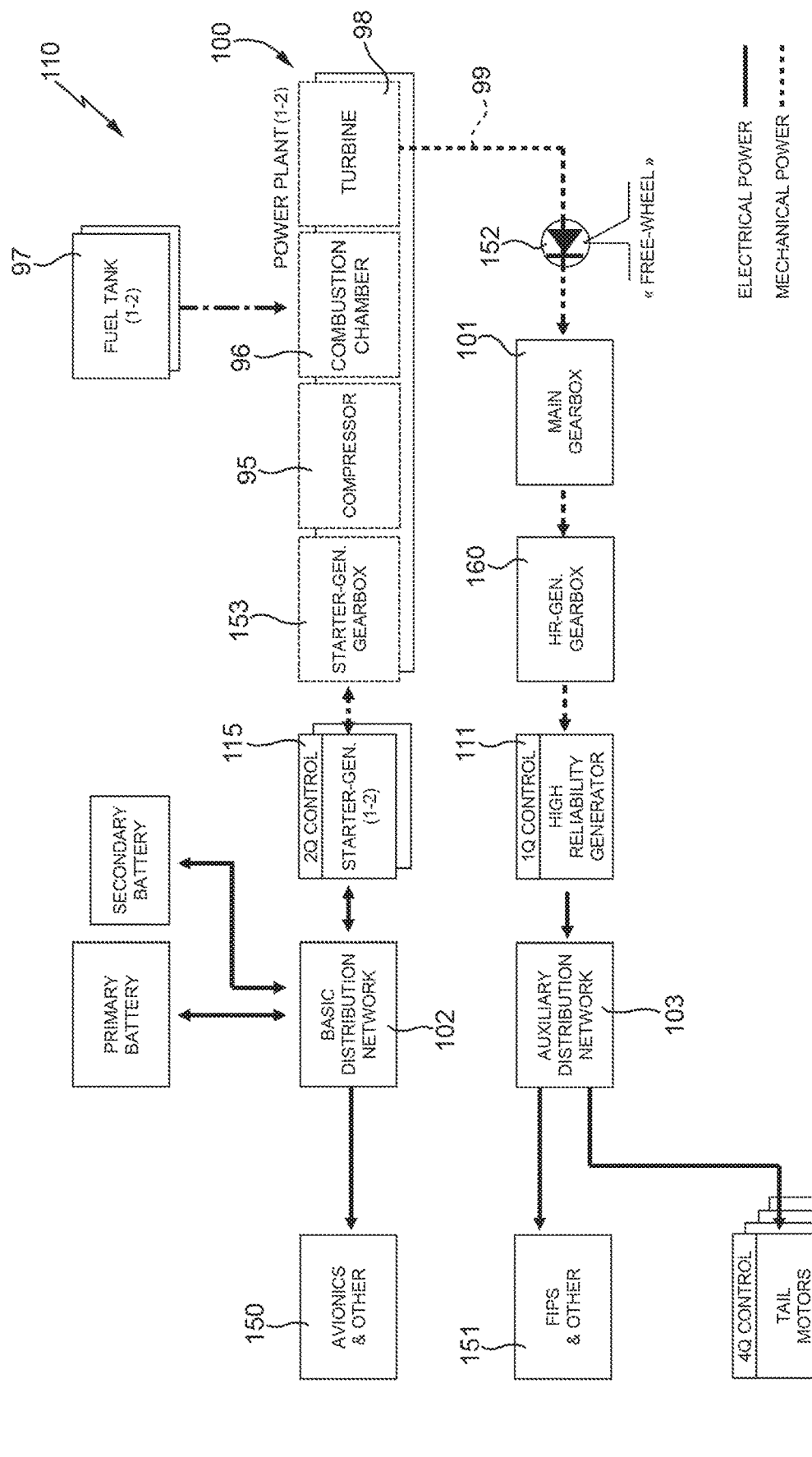
FIG. 10 is a schematic view of the power-flow in the first embodiment of the propulsive unit of FIG. 9.

In the embodiment shown in FIGS. 9 and 10, each power plant 100 is a gas turbine, which substantially comprises (FIG. 10):
an upstream compressor 95, which increases the pressure of an airflow sucked from the outer environment;
a combustion chamber 96, in which a fuel stored in a fuel tank 97 is sprayed into the airflow and ignited, so as to increase the temperature of a mix of air and combusted gas; and
a downstream turbine 98, in which the mix expands and drives in rotation a shaft 99 which is operatively connected to gearbox 101 by the interposition of free-wheel 152.

Auxiliary distribution grid 103 further provides motors 16, 24 with electrical power.

Electric power supply unit 15 further comprises a propulsion system 110 for electrically feeding motors 16, 24 with electrical power.

With reference to FIGS. 9 and 10, propulsions system 110 comprises a single electrical generator 111 which is driven by gearbox 101 and which outputs electrical power.

In particular, the electrical power generated by electrical generator 111 is fed to auxiliary distribution grid 103.

In the embodiment shown, electrical generator 111 is a high-redundancy electrical generator.

Furthermore, electrical generator 111 is a one-way electrical machine, i.e. electrical generator 111 only converts a portion of the mechanical power provided by gearbox 101 in the electrical power fed to auxiliary distribution grid 103.

Furthermore, each power plant 100 is provided with a relative starter generator 115 which is interposed between basic distribution grid 102 and a gearbox 153 (only schematically shown in FIG. 10) of power plant 100 connected to relative compressor 95.

Each starter generator 115 is a two-way electrical machine, i.e. starter generator 115 either converts the electrical power provided by basic distribution grid 102 into mechanical power made available to relative compressor 95 during a start-up step of relative power plant 100 or converts part of the mechanical power provided by relative compressor 95 into electrical power made available to basic distribution grid 102.

Figure 11:
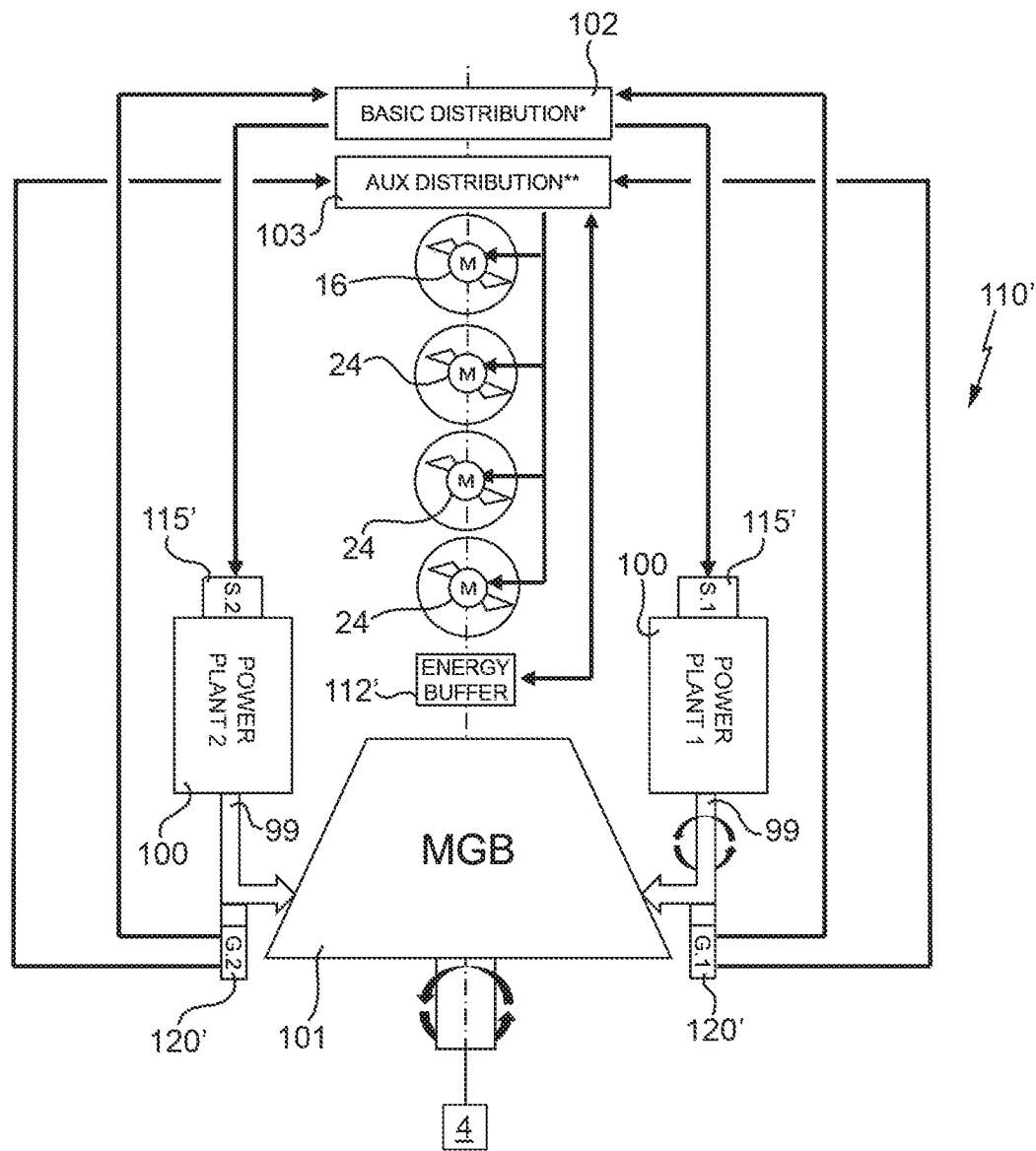
FIG. 11 is a schematic view of a second embodiment of a propulsive unit for the anti-torque system of FIGS. 1 to 8.
Figure 12:
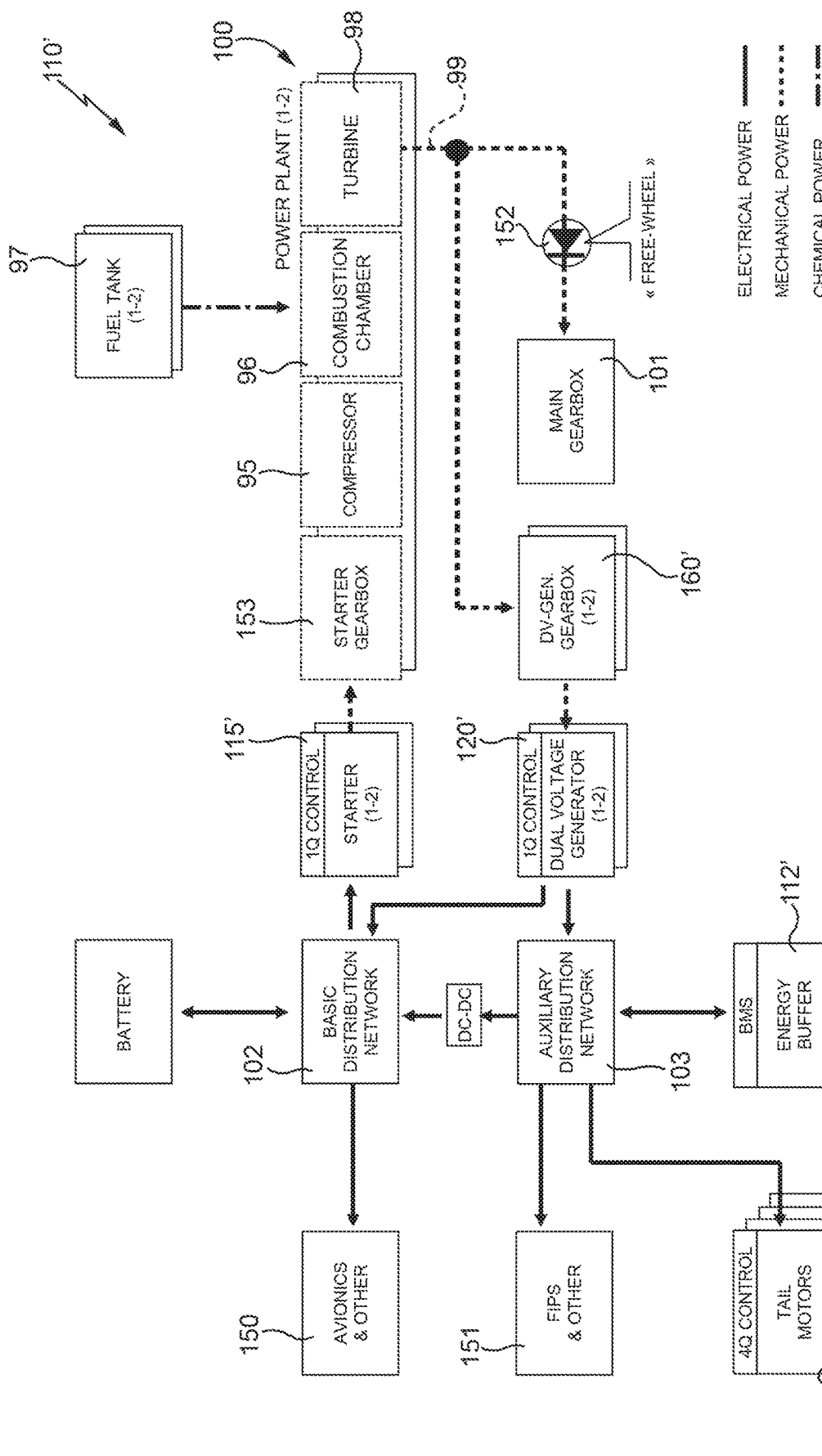
FIG. 12 is a schematic view of the power-flow in the second embodiment of the propulsive unit of FIG. 11.

With reference to FIGS. 11 and 12, 110' indicates a second embodiment of the propulsion system.

Propulsions system, 110' is similar to propulsion system 110 and will be disclosed hereinafter only insofar as it differs from the latter; corresponding parts or equivalents of propulsion system 110, 110' will be indicated, where possible, by the same reference numerals.

Propulsions system 110' differs from propulsion system 110 for not comprising electrical generator 111" and for comprising two electrical generators 120' driven by respective power plant 100.

Electrical generators 120' are one-way electrical machines. In particular, electrical generators 120' only convert a portion of the mechanical power provided by relative shaft 99 into electrical power fed to auxiliary distribution grid 103.

In the embodiment shown, propulsion system 110' comprises a pair of additional gearboxes 160' (schematically shown only in FIG. 12). Each additional gearbox 160' is functionally interposed between a relative shaft 99 and a relative electrical generator 120'.

In the embodiment shown, electrical generators 120' are dual-voltage electrical generators 110', which can feed auxiliary distribution grid 103 with two level of voltages.

Propulsion system 110' also differs from propulsion system 110 for comprising an energy storage 112', e.g. a battery, which is electrically connected to auxiliary distribution grid 103.

Energy storage 112' is normally charged by auxiliary distribution 103 during the normal operation of electrical generator 120'.

Energy storage 112' feeds the auxiliary distribution 102 and, therefore, rotors 16, 24 with electrical power in case of failure of electrical generator 120'.

Finally, propulsions system 110' differs from propulsion system 110 for comprising starters 115' instead of starter generator 115.

Starters 115' are one-way electrical machine, which are capable to convert electrical energy received by basic distribution grid 102 into mechanical power made available to compressors 99 of respective power plants 100'.

Figure 13:
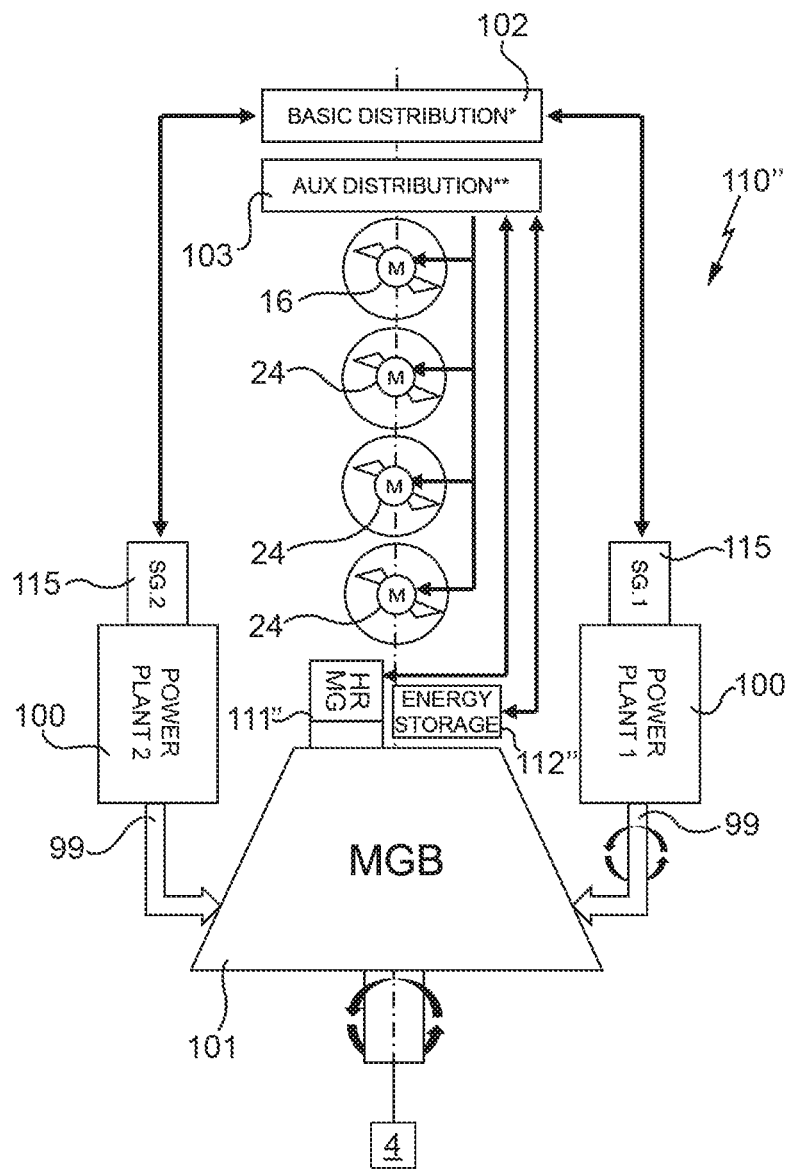
FIG. 13 is a schematic view of a third embodiment of a propulsive unit for the anti-torque system of FIGS. 1 to 8.
Figure 14:
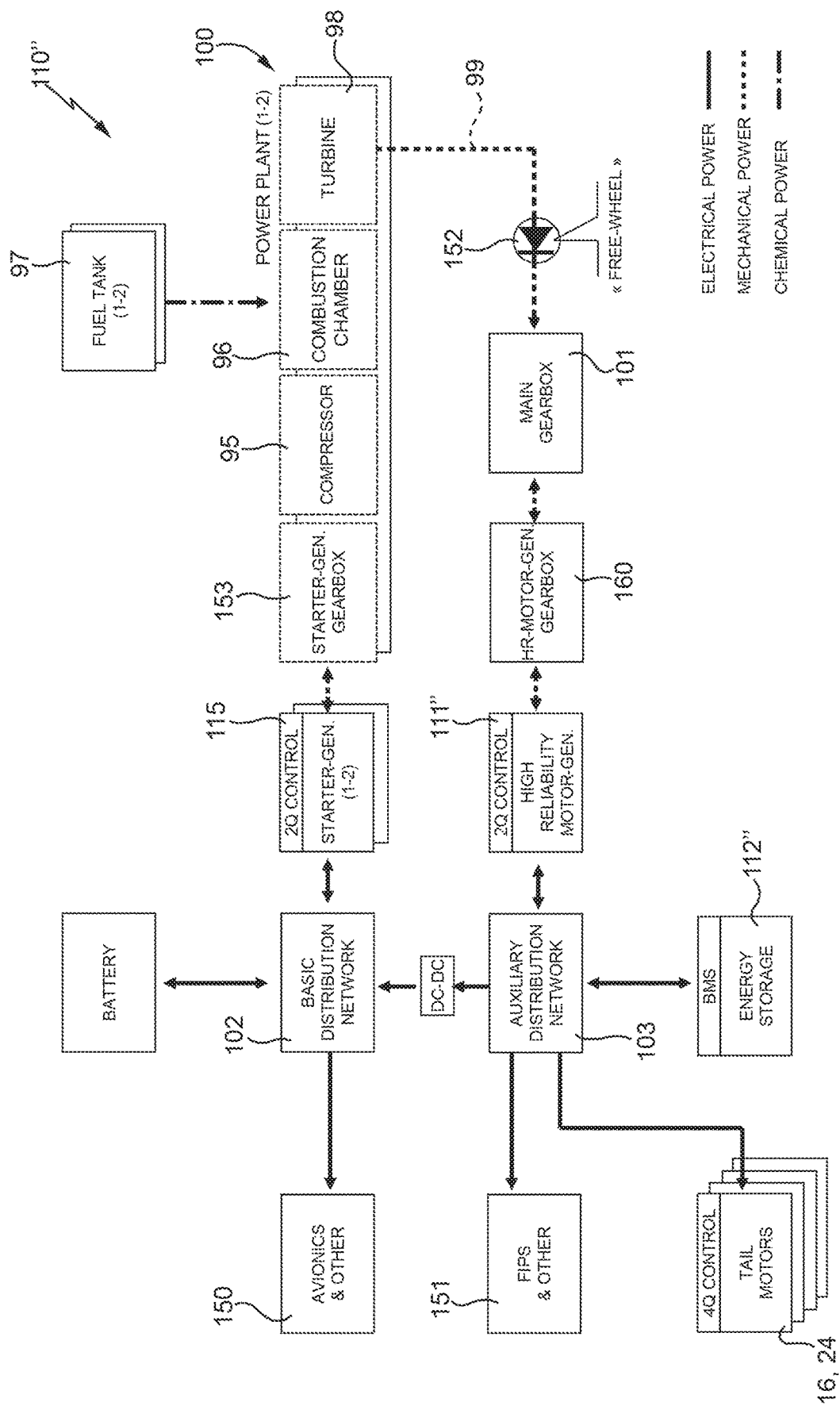
FIG. 14 is a schematic view of the power-flow in the third embodiment of the propulsive unit of FIG. 13.

With reference to FIGS. 13 and 14, 110" indicates a third embodiment of the propulsion system.

Propulsions system, 110" is similar to propulsion system 110 and will be disclosed hereinafter only insofar as it differs from the latter; corresponding parts or equivalents of propulsion system 110, 110" will be indicated, where possible, by the same reference numerals.

In particular, propulsions system 110" differs from propulsion system 110 in that motor-generator 111" is a two-way electrical machine. In particular, motor-generator 111" is capable to convert a part of the mechanical power provided by main gearbox 101 into electrical power made available to auxiliary distribution grid 103 during the normal operation of power plants 100. Alternatively, motor-generator 111" is capable to convert the electrical power provided by auxiliary distribution grid 103 into mechanical power made available to main gearbox 102, in case of failure of one or both power plants 100 or in case a boost power is required due to particularly severe conditions in terms of operative temperature and operative altitude.

Propulsion system 110" also differs from propulsion system 110 for comprising an energy storage 112", e.g. a battery, which is electrically connected to auxiliary distribution grid 103 and, therefore, to rotors 16, 24.

In particular, energy storage 112" is charged by auxiliary distribution 103 during the normal operation of motor-generator 111".

Energy storage 112" feeds the auxiliary distribution 102 and, therefore, rotors 16, 24 with electrical power in case of failure of motor-generator 111".

Figure 15:
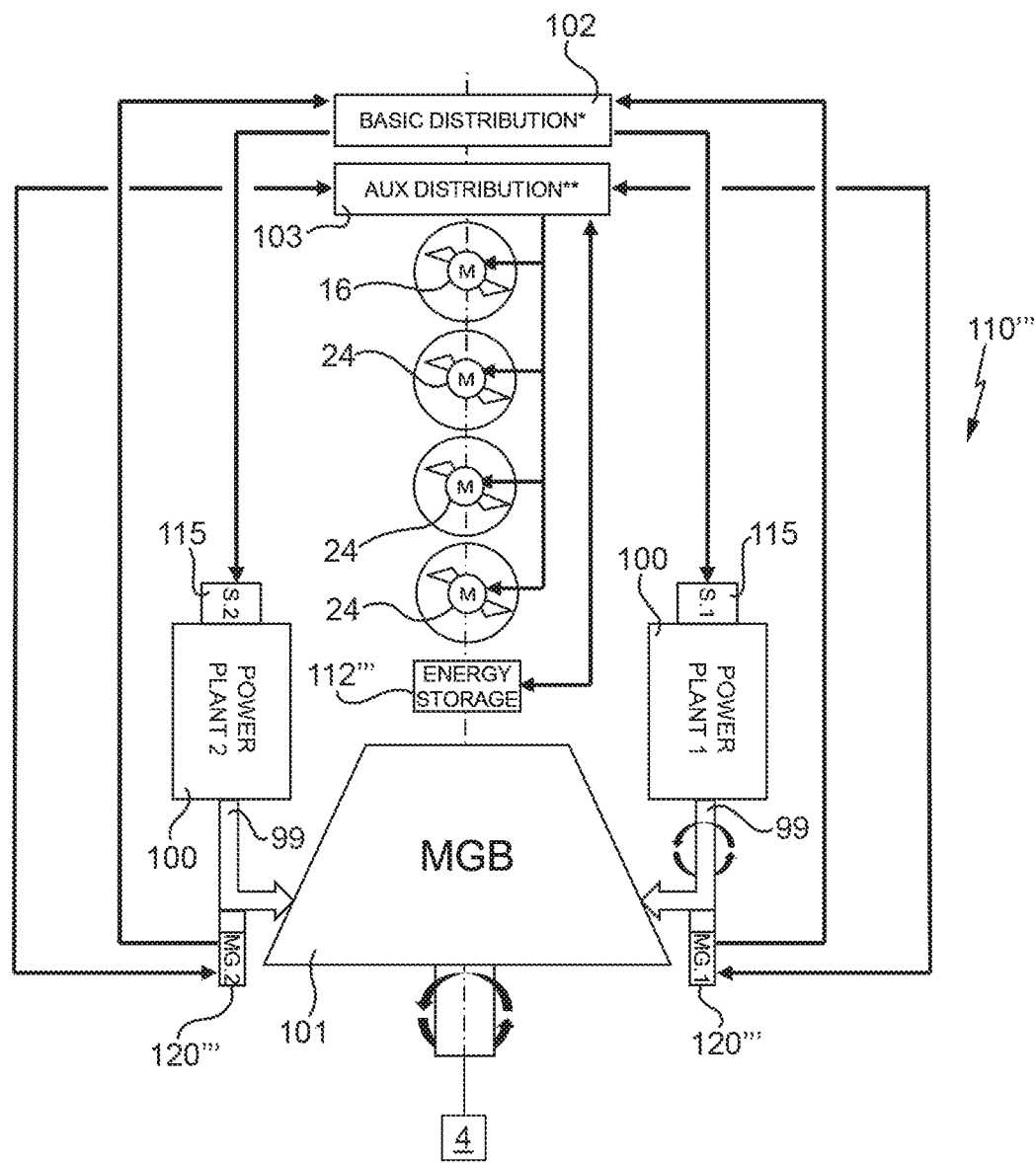
FIG. 15 is a schematic view of a fifth embodiment of a propulsive unit for the anti-torque system of FIGS. 1 to 8.
Figure 16:
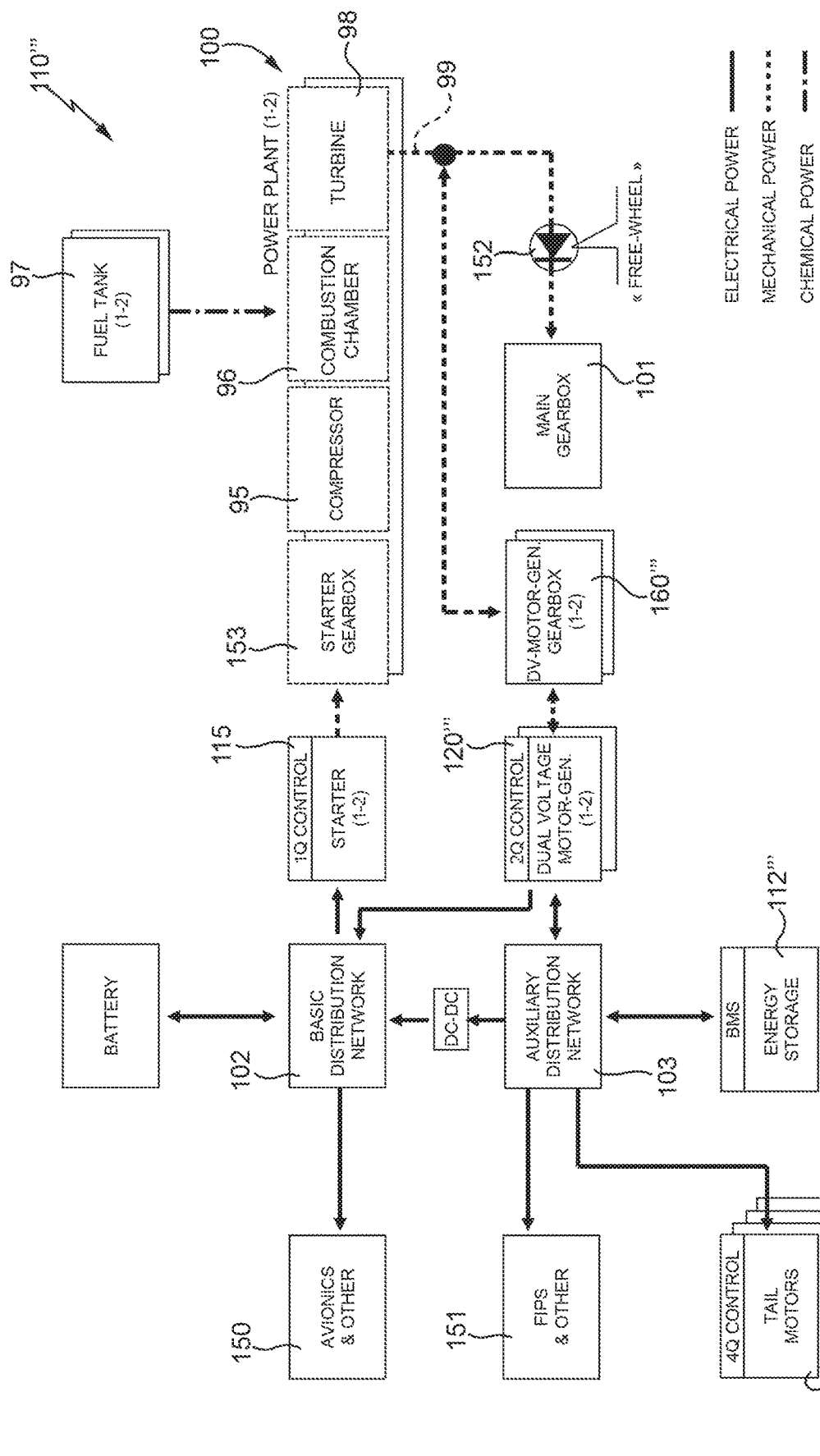
FIG. 16 is a schematic view of the power-flow in the sixth embodiment of the propulsive unit of FIG. 15.

With reference to FIGS. 15 and 16, 110''' indicates a fourth embodiment of the propulsion system.

Propulsion system 110''' is similar to propulsion system 110' and will be disclosed hereinafter only insofar as it differs from the latter; corresponding parts or equivalents of propulsion system 110', 110''' will be indicated, where possible, by the same reference numerals.

In particular, propulsion system 110''' differs from propulsions system 110' for comprising motor-generators 120''' instead of respective electrical generators 120'.

In the embodiment shown, motor-generators 120''' are two-way electrical machines.

In particular, each motor-generator 120''' is capable to convert a part of the mechanical power provided by relative shaft 99 into electrical power made available to auxiliary distribution grid 103—and, therefore, to motors 16, 24 during the normal operation of power plants 100. Alternatively, motor-generator 120''' is capable to convert the electrical power provided by auxiliary distribution grid 103 into mechanical power made available to shaft 99 and therefore to main gearbox 102 in case of failure of one or both power plants 100 or in case a boost power is required due to particularly severe conditions in terms of operative temperature and operative altitude.

In use, operation of rotor 4 enables upward/downward, forward/backward and lateral movement of the helicopter 1.

Operation of rotor 4 generates the first torque C1 on the fuselage 2, which would cause rotation of the helicopter 1 about the yaw axis.

Operation of the anti-torque system 10 generates a second torque C2 on the fuselage 2 in the opposite direction to the first torque C1.

This second torque C2 determines the yaw angle of the helicopter 1.

In greater detail and referring to normal operating condition indicated by A1 in FIG. 6, the control unit 30 controls the electric motors 16 and 24 so as to cause:

rotation of rotor 17 in the first direction of rotation with a first rotational speed; and rotation of rotors 25 in the second direction of rotation with respective second rotational speeds.

In particular, the speeds of rotors 25 could be different from one another.

In this way, rotors 17 and rotors 25 generate respective forces on the fuselage 2 and, therefore, respective third and fourth torques having opposite directions. The resultant of these third and fourth torques generates the second torque C2.

The difference between the second torque C2 and the first torque C1 controls the yaw angle of the helicopter 1.

Referring to operational boundary condition indicated by A3 in FIG. 6, the control unit 30 controls the electric motors 16 and 24 so that the third and fourth torques are in the same direction and can oppose the first torque C1, which is higher than the threshold value.

Preferably, the control unit 30 controls the electric motors 16 and 24 so that both rotors 17 and rotors 25 rotate in the second direction.

The control unit 30 is programmed so that reversal of the direction of rotation of the rotors 17 takes place gradually and that, preferably, the rotors 25 are accelerated during this motion reversal step.

Referring to the further condition indicated by A2 in FIG. 6, in which it is necessary to turn the helicopter 1 very quickly in the direction of application of the first torque C1 on the fuselage 2, the control unit 30 is programmed to slow or even stop the rotation of rotors 25 and to increase the rotational speed of rotor 17 in the first direction.

In this way, the third torque generated by rotor 17 is added to the first torque C1 and allows the helicopter 1 to be quickly turned to the desired yaw angle.

The airflow sucked by rotors 17 and 25 passes through the openings 37 and is substantially undisturbed or negligibly disturbed by the tail portion 5 of the helicopter 1.

In the case where rotors 17 and 25 are arranged so as to generate respective forces on the fuselage 2 also having respective vertical components, the control unit 30 controls the motors 16 and 24 so as to achieve a desired vertical thrust, which enables controlling the pitching movement of the helicopter 1.

Furthermore, power plants 100 drive in rotation main gearbox 101, which, in turn, drives in rotation main rotor 4.

In the embodiment of FIGS. 9 and 10, electrical generator 111 converts part of the mechanical power of main gearbox 101 in electrical power which is made available to auxiliary distribution 103 and, therefore, to motors 16, 24.

Starter generators 115 convert the electrical power provided by basic distribution grid 102 into mechanical power made available to relative compressors 95 during a start-up step of relative power plants 100. Furthermore, starter generators 115 convert part of the mechanical power provided by relative compressors 95 into the electrical power made available to basic distribution grid 102 during a normal operation of relative power plants 100.

With reference to FIGS. 11 and 12, the operation of propulsion system 110' is similar to the one of propulsion system 110 and will be disclosed hereinafter only insofar as it differs from the latter.

Operation of propulsion system 110' differs from the one of propulsion system 110 in that:
- electrical generators 120' convert a portion of the mechanical power provided by relative shafts 99 into electrical power fed to auxiliary distribution grid 103 and, therefore, to motors 16, 24;
- energy storage 112' is normally charged by auxiliary distribution 103 during the normal operation of electrical generator 111', and feeds the auxiliary distribution 102 and, therefore, rotors 16, 24 with electrical power in case of failure of electrical generators 120'; and
- starters 115' are one-way electrical machine, which are only capable to convert electrical energy received by auxiliary distribution grid 102 into mechanical power made available to compressors 99 of respective power plants 100'.

With reference to FIGS. 13 and 14, the operation of propulsion system 110" is similar to the one of propulsion system 110 and will be disclosed hereinafter only insofar as it differs from the latter.

Operation of propulsion system 110" differs from the one of propulsion system 110 in that:
- motor-generator 111" converts a part of the mechanical power provided by main gearbox 101 into electrical power made available to auxiliary distribution grid 103 and therefore to rotors 16, 24 during the normal operation of power plants 100;
- motor-generator 111" converts the electrical power provided by auxiliary distribution grid 103 into mechanical power made available to main gearbox 102 in case of failure of one or both power plants 100 or in case a boost power is required due to particularly severe conditions in terms of operative temperature and operative altitude;
- energy storage 112" is charged by auxiliary distribution 103 during the normal operation of motor-generator 111"; and
- energy storage 112" feeds the auxiliary distribution 102 and, therefore, rotors 16, 24 with electrical power in case of failure of motor-generator 111".

With reference to FIGS. 15 and 16, the operation of propulsion system 110''' is similar to the one of propulsion system 110' and will be disclosed hereinafter only insofar as it differs from the latter.

Operation of propulsion system 110''' differs from the one of propulsion system 110' in that:
- each motor-generator 120''' converts a part of the mechanical power provided by relative shaft 99 into electrical power made available to auxiliary distribution grid 103—and, therefore, to motors 16, 24—during the normal operation of power plants 100; and
- each motor-generator 120''' converts the electrical power provided by auxiliary distribution grid 103 into mechanical power made available to shaft 99 and therefore to main gearbox 102 in case of failure of one or both power plants 100 or in case a boost power is required due to particularly severe conditions in terms of operative temperature and operative altitude.

From examination of the characteristics of helicopter 1, the advantages achievable therewith are evident.

In particular, the anti-torque system 10 comprises a rotor 17 rotatable with a first angular speed and driven by an electric motor 16 and a plurality of rotors 25 rotatable with respective second angular speeds and driven by respective electric motors 24.

In consequence, the anti-torque system 10 has a certain level of redundancy that enables ensuring a certain level of operational functionality in the event of failure of one of rotors 17 and 25.

Furthermore, differently from EP-B-3254962, anti-torque system is integrated with the tail boom 50 and therefore structurally contributes to support the bending moment and the shear stress generated by fin 6 and tailplane 7, either due to their mass and/or impinging aerodynamic forces.

As a consequence, the same tail boom 50 is both a structural element and a containment element for anti-torque system 10 whereas the anti-torque system of EP-B-3254962 is connected at the aft end of tail boom 50 and simply subjected to the loads generated by itself.

Secondly, differently from EP-B-3254962, it is possible to preserve the advantages provided by the arrangement of fin 6 at the aft end of tail boom 50 and of tailplane 7 on the top of the fin 6, without increasing the overall drag, weight and level of noise and vibrations of helicopter 1.

In particular, fin 6 allows to further control the yaw of the helicopter 1 especially in forward flight. This additional yaw control is helpful in case of breakdown of the anti-torque system 10 or in case anti-torque system 10 is intentionally stopped (or slowed) in forward flight to save energy and reduce the external noise. Tailplane 7 effect is instead that to increase the vertical stability of helicopter 1. Being positioned at the top end of fin 6, tailplane 7 is only marginally impinged by the wake of the rotor 4. Accordingly, the generation of noise and vibrations is reduced with special reference to the transition from hovering to forward flight.

On the contrary, EP-A-3254962 comprises a pair of lateral stabilizers, which laterally project from the tail boom. These lateral stabilizers increase the transversal cross-section and the weight of the helicopter. Furthermore, due to their position, the lateral stabilizers are arguably impinged by the wake generated by the main rotor. In order to avoid this issue, the stabilizers could be stretched out which however would further penalize the overall drag and weight of the helicopter.

Propulsion system 110, 110" is particularly cost-effective since it requires a single generator 111, 111" for electrically feeding motors 16, 24. Furthermore, energy storage 112" can be efficiently used to feeds the auxiliary distribution 102 and, therefore, rotors 16, 24 with electrical power in case of failure of generator 111, 111".

Propulsion system 110" is still further advantageous because single generator 111" is a motor-generator. In this way, motor generator 120''' converts the electrical power provided by auxiliary distribution grid 103 into mechanical power made available to shaft 99 and therefore to main gearbox 102 in case of failure of one or both power plants 100 or in case a boost power is required due to particularly severe conditions in terms of operative temperature and operative altitude.

Propulsion system 110', 110''' comprise two generators 120', 120" thus being more reliable in case of failure of one generator 120, 120".

The reliability of propulsion system 110', 110''' is increased by energy storage 112', 112''', which feeds auxiliary distribution 102 and, therefore, rotors 16, 24 with electrical power in case of failure of electrical generators 120'.

With reference to propulsion system 110''', motor-generator 120''' converts the electrical power provided by auxiliary distribution grid 103 into mechanical power made available to shaft 99 and therefore to main gearbox 102 in case of failure of one or both power plants 100 or in case a boost power is required due to particularly severe conditions in terms of operative temperature and operative altitude.

Furthermore, due to the fact that electric motors 16 and 24 have, over a wide range rotational speeds, a mass proportional to the maximum torque they can generate, the division of the second torque C2 over multiple rotors 17 and 25 allows reducing the torques that the must be produced individually by rotors 17 and 25. In consequence, it is possible to also reduce the mass of rotors 17 and 25 with respect to an equivalent anti-torque system 50 with a single electric rotor (FIG. 7) having the same resultant force on the fuselage 2, the same area equal to the sum of the areas of rotors 17 and 25 and the same maximum tip speed of the corresponding blades 19 and 27.

More specifically, with all other conditions being equal, the overall weight of the electric machines decreases as the overall number of rotors 17 and 25 increases, with evident advantages in the helicopter industry.

Due to the fact that rotors 17 and 25 have respective areas smaller than the overall area of the aforementioned equivalent single-rotor anti-torque system 50, it is possible to raise rotational speed of the aforesaid rotors 17 and 25 without exceeding the maximum tip speed of the corresponding blades 19 and 27, and therefore without causing the aforesaid corresponding blades 19 and 27 to stall.

This increase rotational speed of rotors 17 and 25 is achieved without using a gearbox between the electric motors 16 and 24 and the respective rotors 17 and 25.

In addition to avoiding the weights of associated gearboxes, the direct drive connection between the electric motors 16 and 24 and the respective rotors 17 and 25 enables avoiding the onerous maintenance and lubrication problems of such gearboxes. With regard to this, it should be noted that any gearbox inserted between the electric motor 16 and rotor 17 must necessarily transmit motion to rotor 17 both in the first direction and in the second direction, generating significant fatigue stresses on the components of the gearbox.

The rotors 17 and 25 can be made with smaller areas, and therefore smaller diameters, with respect to the aforementioned equivalent single-rotor anti-torque system 50 (schematically shown in FIG. 7). Thanks to this, rotors 17 and 25 can be easily arranged in a position where they aerodynamically interfere in a substantially reduced manner with rotor 4. In consequence, the performance of the helicopter 1 can be improved and the external noise generated by the helicopter 1 can be reduced.

Rotors 17 and 25 could be arranged along the tail portion 5 with the respective discs laying on respective planes transversal with respect to the vertical direction. In this way, the control unit 30 could control the rotational speed of these rotors 17 and 25 so as to generate a vertical lift, which is useful to control the pitching of the helicopter 1.

Moreover, unlike the known solutions described in the introductory part of this description, the anti-torque system 10 enables controlling the yaw angle of the helicopter 1 and countering the first torque C1 by acting exclusively on the angular speeds of rotors 17 and 25.

In consequence, the anti-torque system 10 also enables using rotors 17 and 25 having respective blades 19 and 27 with respective fixed pitch angles, with evident constructional simplifications.

Under such circumstances, the anti-torque system 10 is found to be particularly advantageous with respect to solutions using a single anti-torque rotor with blades having a fixed pitch angle. In fact, these last solutions necessarily require reversing the direction of rotation of the single anti-torque rotor when it is necessary to reverse the direction of the torque applied on the fuselage to control the yaw angle. This reversal requires stopping the rotation of the single anti-torque rotor and accelerating it in the opposite direction. In this situation, the helicopter inevitably remains difficult to control during the period of transition.

Conversely, the solution according to the present invention enables, under normal operating conditions of the helicopter 1 (area A1 in FIG. 6), reversing the direction of the second torque C2 applied on the fuselage 2 of the helicopter by simply reducing or increasing the angular speeds of rotors 17 and 25 and without needing to stop them.

This makes the helicopter 1 particularly controllable for a wide range of yaw angles corresponding to the power values, and therefore of more present first torque C1 in the flight phases of the helicopter 1.

Even when it is necessary to reverse the direction of rotation of rotor 17 in the operational boundary condition of the helicopter 1 (area A3 in FIG. 6), it is not necessary to instantly stop rotation of rotor 17 in the first direction. On the contrary, in this boundary condition, the control unit 30 causes an increase in the rotational speed of rotors 25 in the second direction, while rotor 17 slows its rotation in the first direction, stops and accelerates in the second direction.

As visible in FIG. 6, the anti-torque system 10 enables performing the hovering turn manoeuvre shown in FIG. 6 by simple controlling rotors 17 and 25 partly according to what is applicable in normal operating conditions of the helicopter 1 and partly according to what is applicable in the boundary condition of the helicopter 1.

The anti-torque system 10 also enables turning the helicopter 1 very quickly in the direction of application of the first torque C1 (area A2 in FIG. 6). In this situation, the control unit 30 increases the rotational speed of rotor 17 in the first direction and slows or even stops the rotational speed of rotors 25 in the second direction.

The openings 37 pass through the tail portion 5 and are arranged at respective intake areas 38.

In this way, the airflow sucked by rotors 17 and 25 is substantially undisturbed or negligibly disturbed by the tail portion 5 of the helicopter 1. This ensures consequent efficient operation of rotors 17 and 25.

The placement of rotors 17 and 25 limits the risk of them being damaged and/or causing hazards in the landing area of the helicopter 1, in the event of an emergency landing (FIG. 2). In such an event, the helicopter 1 might not land with the undercarriages 40 resting on the ground, but with an inclined pitch with respect to the ground. In this condition, rotors 17 and 25 are kept off the ground.

Lastly, the supports of the electric motors 16 and 24 could be integrated in the tail portion 5 so as to also perform a structural function.

Duct 91 ducts more than one rotors 25, three in the embodiment shown.

In this way, it is possible to achieve the same aerodynamic advantages of a solution with all rotors 25 individually ducted while at the same time avoiding the geometric constrains that these individual duct would pose to the layout of tail boom 5.

Finally, it is clear that modifications and variants can be made regarding helicopter 1 without departing from the scope of protection defined by the claims.

In particular, propulsion system 100, 100', 100", 100''' could be applied to a helicopter with a single anti-torque rotor 17, 25.

The invention claimed is:

1. A helicopter (1) comprising:
   a fuselage (2);
   a first main rotor (4), which is adapted to generate, in use, the necessary lift for the flight of said helicopter (1) and to enable the forward/backward, upward/downward and lateral movement of said helicopter (1), and generating, in use, a first torque (C1) on said fuselage (2);
   an anti-torque system (10) adapted to generate, in use, a second torque (C2) having a main component in the same or opposite direction with respect to said first torque (C1), so as to control the yaw angle of said helicopter (1); and
   a tail portion (5) connected to said fuselage (2);
   said tail portion (5) comprising, in turn:
   a tail boom (50) connected to said fuselage (2);
   a fin (6) protruding from an aft end of said tail boom (50) on the opposite side of said fuselage (2) and transversally with respect to said tail boom (50); and
   a tailplane (7) projecting in cantilever fashion on both sides of said fin (6);
   said tail boom (50) being adapted to sustain the bending moments and the shear stress generated, in use, by the weight of said fin (6) and said tailplane (7);
   characterized in that said anti-torque system (10) integrated with said tail boom (50) and comprises;
      an electric power supply unit (15);
      at least one second rotor (17) operatively connected to said electric power supply unit (15) and operable by said electric power supply unit (15) so as to rotate with a first variable angular speed; and
      at least one third rotor (25) operatively connected to said electric power supply unit (15) and operable by said electric power supply unit (15) so as to rotate with a second variable angular speed;
   said tail portion (5) comprising, in turn:
      a plurality of walls (35) supporting respective said second and third rotors (17, 25);
      a plurality of openings (37) delimited by said walls (35), passing across said tail portion (5) and having sufficient breadth to allow, in use, a correct supply of air to said second and third rotors (17, 25).

2. The helicopter according to claim 1, characterized in that it comprises a plurality of said second rotors (25) rotating about respective axes (C) staggered from one another.

3. The helicopter according to claim 2, characterized in that at least one of said second rotors (25) is ducted by means of a relative duct (90).

4. The helicopter according to claim 2, characterized by comprising a single duct (91), which ducts at least two second rotors (25).

5. The helicopter according to claim 1, characterized in that said anti-torque system (10) is connected in a fixed way and integral to said tail portion (5).

6. The helicopter according to claim 1, characterized in that said tailplane (7) is arranged at a free end of said fin (6) opposite to said aft end of said tail boom (50).

7. The helicopter of claim 1, further comprising:
   at least one power plant (100); and
   a gearbox (101) drivable by said power plant (100) and operable to drive said first rotor (4);
   said electric power supply unit (15) comprising, in turn, an electric propulsion system (110, 110', 110", 110''') operatively connected with said power plant (100) and with said second and third rotor (17, 25) to feed said second and third rotor (17, 25) with electrical power.

8. The helicopter of claim 7, characterized by comprising an electrical power distribution grid (103) electrically connected with said second and third rotor (17, 25) to feed them with electrical power;
   said electric propulsion system (110, 110', 110", 110''') feeding said electrical power distribution grid (103) with said electrical power.

9. The helicopter of claim 7, characterized in that said electric propulsion system (110, 110") comprises a first electrical generator (111, 111") functionally interposed between said gearbox (101) and said second and third rotor (17, 25).

10. The helicopter of claim 9, characterized in that said first electrical generator (111) is a one-way electrical machine, which is capable to convert, in use, the mechanical power provided by said gearbox (101) in electrical power fed, in use, to said second and third rotor (17, 25).

11. The helicopter of claim 9, characterized in that said first electrical generator (111") is a two-way electrical machine, which is capable:
   either to convert, in use, the mechanical power provided by said gearbox (101) in electrical power fed, in use, to said second and third rotor (17, 25); or
   to convert, in use, the electrical power of said electrical power distribution grid (103) to said gearbox (101) and, therefore, to said first rotor (4).

12. The helicopter of claim 11, characterized in that said electric propulsion system (110, 110") comprises an energy storage device (112"), which is electrically connected to said electrical power distribution grid (103);
   said energy storage device (112") being charged, in use, by said electrical power distribution grid (103) during a normal operation of said first electrical generator (111");
   said energy storage device (112") feeding, in use, said electrical power distribution grid (103) in case of failure of said first electrical generator (111").

13. The helicopter of claim 7, characterized in that said electric propulsion system (110', 110''') comprises at least one second electrical generator (120', 120''') functionally interposed between said power plant (100) and said electrical power distribution grid (103).

14. The helicopter of claim 13, characterized by comprising a free-wheel (152) interposed between said power plant (100) and said gearbox (101);
   said electrical propulsion system (110', 110''') being connected to said power plant (100) in such a way that said free-wheel (152) is also interposed between said gearbox (101) and said electrical propulsion system (110', 110''').

15. The helicopter of claim 14, characterized in that said second generator (120') is a one-way electrical machine, which is capable to convert, in use, the mechanical power provided by said power plant (100) in electrical power fed, in use, to said second and third rotor (17, 25).

16. The helicopter of claim 14, characterized in that said second generator (120") is a two-way electrical machine, which is capable:
   either to convert, in use, the mechanical power provided by said power plant (100) in electrical power fed, in use, to said second and third rotor (17, 25); or
   to convert, in use, the electrical power of said electrical power distribution grid (103) to said power plant (100) and, therefore, to said first rotor (4).

17. The helicopter of claim 16, characterized by in that said second generator (120''') is integrated in said power plant (100).

18. The helicopter of claim 13, when depending on claim 7, characterized by comprising a further basic distribution grid (102) provided to electrically feed low power electrical loads (150);
Said second generator (120', 120''') being a dual voltage generator, which can feed said electrical power distribution grid (103) and said further basic distribution grid (102) with two level of voltages.

19. The helicopter of claim 13, said electric propulsion system (110', 110''') comprises an energy storage device (112'''), which is electrically connected to said electrical power distribution grid (103);
said energy storage device (112''') being charged, in use, by said electrical power distribution grid (103) during a normal operation of said second electrical generator (120', 120''');
said energy storage device (112'') feeding, in use, said electrical power distribution grid (103) in case of failure of said second electrical generator (120', 120'').

20. A helicopter (1) comprising:
a fuselage (2);
a first main rotor (4), which is adapted to generate, in use, the necessary lift for the flight of said helicopter (1) and to enable the forward/backward, upward/downward and lateral movement of said helicopter (1), and generating, in use, a first torque (C1) on said fuselage (2);
an anti-torque system (10) adapted to generate, in use, a second torque (C2) having a main component in the same or opposite direction with respect to said first torque (C1), so as to control the yaw angle of said helicopter (1);
said anti-torque system (10) comprising:
an electric power supply unit (15); and
at least one second rotor (17) operatively connected to said electric power supply unit (15) and operable by said electric power supply unit (15) so as to rotate with a first variable angular speed;
at least one third rotor (25) operatively connected to said electric power supply unit (15) and operable by said electric power supply unit (15) so as to rotate with a second variable angular speed;
characterized in that it comprises a tail portion (5) connected to said fuselage (2) and supporting said second and third rotors (17, 25);
said tail portion (5) comprising, in turn:
a plurality of walls (35) supporting respective said second and third rotors (17, 25);
a plurality of openings (37) delimited by said walls (35), passing across said tail portion (5) and having sufficient breadth to allow, in use, a correct supply of air to said second and third rotors (17, 25).

21. The helicopter according to claim 20, characterized in that it comprises a plurality of said third rotors (25).

22. The helicopter according to claim 21, characterized in that at least one of said third rotors (25) is ducted.

23. The helicopter according to claim 1, characterized in that said electric power supply unit (15) comprises, in turn:
at least one first electric motor (16) operatively connected to said second rotor (17) and adapted to drive, in use, said second rotor (17); and
a plurality of second electric motors (24) operatively connected to respective said third rotors (25) and adapted to drive, in use, the respective said third rotors (25).

24. The helicopter according to claim 23, characterized in that:
said first electric motor (16) is directly connected to said second rotor (17); and/or
at least one of said second electric motors (24) is directly connected to the respective said third rotor (25).

25. The helicopter according to claim 1, characterized in that said second and third rotors (17, 25) each comprise:
a hub (18, 26) rotatable about a respective rotation axis (B, C); and
a plurality of blades (19, 27) supported by said hub (18, 26) and each having a fixed pitch angle with respect to said respective rotation axis (B, C).

26. The helicopter according to claim 25, characterized in that it comprises a control unit (30) functionally connected to said electric power supply unit (15) and programmed to:
cause rotation of said first rotor (16) in a first direction of rotation and of said third rotor (25) in a second direction of rotation, opposite to said first direction, in a flight condition of said helicopter (1) in which said first torque (C1) is lower than a threshold value; and/or
cause rotation of said second rotor (17) also in said second direction when said first torque (C1) is higher than said threshold value; and/or
increase said rotational speed of said second rotor (17) in said first direction and decrease said rotational speed of said at least one second rotor (25) in said second direction, if said helicopter (1) must be turned in the same direction of said first torque (C1).

27. The helicopter according to claim 26, characterized in that said second direction of rotation of said second or third rotors (17, 25) generates, in use, a third torque on said fuselage (2) having a main component in the opposite direction with respect to said first torque (C1).

28. A helicopter (1) comprising:
a fuselage (2);
a first main rotor (4), which is adapted to generate, in use, the necessary lift for the flight of said helicopter (1) and to enable the forward/backward, upward/downward and lateral movement of said helicopter (1), and generating, in use, a first torque (C1) on said fuselage (2);
an anti-torque system (10) adapted to generate, in use, a second torque (C2) having a main component in the same or opposite direction with respect to said first torque (C1), so as to control the yaw angle of said helicopter (1); and
a tail portion (5) connected to said fuselage (2);
said tail portion (5) comprising, in turn:
a tail boom (50) connected to said fuselage (2);
a fin (6) protruding from an aft end of said tail boom (50) on the opposite side of said fuselage (2) and transversally with respect to said tail boom (50); and
a tailplane (7) projecting in cantilever fashion on both sides of said fin (6);
said tail boom (50) being adapted to sustain the bending moments and the shear stress generated, in use, by the weight of said fin (6) and said tailplane (7);
characterized in that said anti-torque system (10) is integrated with said tail boom (50);
said anti-torque system (10) comprising:
an electric power supply unit (15);
at least one second rotor (17) operatively connected to said electric power supply unit (15) and operable by said electric power supply unit (15) so as to rotate with a first variable angular speed; and
at least one third rotor (25) operatively connected to said electric power supply unit (15) and operable by said electric power supply unit (15) so as to rotate with a second variable angular speed;

said helicopter (1) further comprising a plurality of said second rotors (25) rotating about respective axes (C) staggered from one another, and a single duct (91), which ducts at least two second rotors (25).

29. A helicopter (1) comprising:
a fuselage (2);
a first main rotor (4), which is adapted to generate, in use, the necessary lift for the flight of said helicopter (1) and to enable the forward/backward, upward/downward and lateral movement of said helicopter (1), and generating, in use, a first torque (C1) on said fuselage (2);
an anti-torque system (10) adapted to generate, in use, a second torque (C2) having a main component in the same or opposite direction with respect to said first torque (C1), so as to control the yaw angle of said helicopter (1); and
a tail portion (5) connected to said fuselage (2);
said tail portion (5) comprising, in turn:
a tail boom (50) connected to said fuselage (2);
a fin (6) protruding from an aft end of said tail boom (50) on the opposite side of said fuselage (2) and transversally with respect to said tail boom (50); and
a tailplane (7) projecting in cantilever fashion on both sides of said fin (6);
said tail boom (50) being adapted to sustain the bending moments and the shear stress generated, in use, by the weight of said fin (6) and said tailplane (7);
characterized in that said anti-torque system (10) is integrated with said tail boom (50);
said anti-torque system (10) further comprising:
an electric power supply unit (15);
at least one second rotor (17) operatively connected to said electric power supply unit (15) and operable by said electric power supply unit (15) so as to rotate with a first variable angular speed; and
at least one third rotor (25) operatively connected to said electric power supply unit (15) and operable by said electric power supply unit (15) so as to rotate with a second variable angular speed;
said helicopter (1) further comprising:
at least one power plant (100); and
a gearbox (101) drivable by said power plant (100) and operable to drive said first rotor (4);
said electric power supply unit (15) comprising, in turn, an electric propulsion system (110', 110''') operatively connected with said power plant (100) and with said second and third rotor (17, 25) to feed said second and third rotor (17, 25) with electrical power;
said helicopter (1) further comprising an electrical power distribution grid (103) electrically connected with said second and third rotor (17, 25) to feed them with electrical power;
said electric propulsion system (110', 110''') feeding said electrical power distribution grid (103) with said electrical power;
said electric propulsion system (110', 110''') comprising at least one first electrical generator (120', 120''') functionally interposed between said power plant (100) and said electrical power distribution grid (103);
said helicopter (1) further comprising a further basic distribution grid (102) provided to electrically feed low power electrical loads (150);
said first electrical generator (120', 120''') being a dual voltage generator, which can feed said electrical power distribution grid (103) and said further basic distribution grid (102) with two level of voltages.

30. A helicopter (1) comprising:
a fuselage (2);
a first main rotor (4), which is adapted to generate, in use, the necessary lift for the flight of said helicopter (1) and to enable the forward/backward, upward/downward and lateral movement of said helicopter (1), and generating, in use, a first torque (C1) on said fuselage (2);
an anti-torque system (10) adapted to generate, in use, a second torque (C2) having a main component in the same or opposite direction with respect to said first torque (C1), so as to control the yaw angle of said helicopter (1); and
a tail portion (5) connected to said fuselage (2);
said tail portion (5) comprising, in turn:
a tail boom (50) connected to said fuselage (2);
a fin (6) protruding from an aft end of said tail boom (50) on the opposite side of said fuselage (2) and transversally with respect to said tail boom (50); and
a tailplane (7) projecting in cantilever fashion on both sides of said fin (6);
said tail boom (50) being adapted to sustain the bending moments and the shear stress generated, in use, by the weight of said fin (6) and said tailplane (7);
characterized in that said anti-torque system (10) is integrated with said tail boom (50);
said anti-torque system (10) further comprising:
an electric power supply unit (15);
at least one second rotor (17) operatively connected to said electric power supply unit (15) and operable by said electric power supply unit (15) so as to rotate with a first variable angular speed; and
at least one third rotor (25) operatively connected to said electric power supply unit (15) and operable by said electric power supply unit (15) so as to rotate with a second variable angular speed;
said helicopter (1) further comprising:
at least one power plant (100); and
a gearbox (101) drivable by said power plant (100) and operable to drive said first rotor (4);
said electric power supply unit (15) comprising, in turn, an electric propulsion system (110''') operatively connected with said power plant (100) and with said second and third rotor (17, 25) to feed said second and third rotor (17, 25) with electrical power;
said helicopter (1) further comprising an electrical power distribution grid (103) electrically connected with said second and third rotor (17, 25) to feed them with electrical power;
said electric propulsion system (110''') feeding said electrical power distribution grid (103) with said electrical power;
said electric propulsion system (110''') comprising at least one first electrical generator (120''') functionally interposed between said power plant (100) and said electrical power distribution grid (103);
said electric propulsion system (110''') comprising an energy storage device (112'''), which is electrically connected to said electrical power distribution grid (103);
said energy storage device (112''') being charged, in use, by said electrical power distribution grid (103) during a normal operation of said second electrical generator (120''');
said energy storage device (112") feeding, in use, said electrical power distribution grid (103) in case of failure of said second electrical generator (120''');
said power plant (100) being a gas turbine, which substantially comprises:

an upstream compressor (95), which increases, in use, the pressure of an airflow sucked from the outer environment;

a combustion chamber (96), in which a fuel stored in a fuel tank (97) is, in use, sprayed into the airflow and ignited, so as to increase the temperature of a mix of air and combusted gas; and a downstream turbine (98), in which said mix, in use, expands and drives in rotation a shaft (99) which is operatively connected to said gearbox (101) by the interposition of free-wheel (152);

said second generator (120′′′) being integrated in said power plant (100);

said second electrical generator (120′′′) being a two-way electrical machine;

said second electrical generator (120′′′) being a motor-generator;

said second electrical generator (120′′′) being either capable to convert a part of the mechanical power provided by said shaft (99) into electrical power made available to said electrical auxiliary distribution grid (103) during the normal operation of said power plants (100); and said second electrical generator (120′′′) being alternatively capable to convert the electrical power provided by electrical distribution grid (103) into mechanical power made available to said shaft (99) and therefore to said main gearbox (101) in case of failure of said power plants (100) or in case a boost power is required due to particularly severe conditions in terms of operative temperature and operative altitude.

31. A helicopter (1) comprising:

a fuselage (2);

a first main rotor (4), which is adapted to generate, in use, the necessary lift for the flight of said helicopter (1) and to enable the forward/backward, upward/downward and lateral movement of said helicopter (1), and generating, in use, a first torque (C1) on said fuselage (2);

an anti-torque system (10) adapted to generate, in use, a second torque (C2) having a main component in the same or opposite direction with respect to said first torque (C1), so as to control the yaw angle of said helicopter (1); and a tail portion (5) connected to said fuselage (2);

said tail portion (5) comprising, in turn:

a tail boom (50) connected to said fuselage (2);

a fin (6) protruding from an aft end of said tail boom (50) on the opposite side of said fuselage (2) and transversally with respect to said tail boom (50); and a tailplane (7) projecting in cantilever fashion on both sides of said fin (6);

said tail boom (50) being adapted to sustain the bending moments and the shear stress generated, in use, by the weight of said fin (6) and said tailplane (7);

characterized in that said anti-torque system (10) integrated with said tail boom (50) and comprises;

an electric power supply unit (15);

at least one second rotor (17) operatively connected to said electric power supply unit (15) and operable by said electric power supply unit (15) so as to rotate with a first variable angular speed; and at least one third rotor (25) operatively connected to said electric power supply unit (15) and operable by said electric power supply unit (15) so as to rotate with a second variable angular speed;

said tail portion (5) comprising, in turn:

a plurality of walls (35) supporting respective said second and third rotors (17, 25);

a plurality of openings (37) delimited by said walls (35), passing across said tail portion (5) and having sufficient breadth to allow, in use, a correct supply of air to said second and third rotors (17, 25);

wherein said second and third rotors (17, 25) each comprise:

a hub (18, 26) rotatable about a respective rotation axis (B, C); and a plurality of blades (19, 27) supported by said hub (18, 26) and each having a fixed pitch angle with respect to said respective rotation axis (B, C); and a control unit (30) functionally connected to said electric power supply unit (15) and programmed to:

cause rotation of said first rotor (16) in a first direction of rotation and of said third rotor (25) in a second direction of rotation, opposite to said first direction, in a flight condition of said helicopter (1) in which said first torque (C1) is lower than a threshold value; and cause rotation of said second rotor (17) also in said second direction when said first torque (C1) is higher than said threshold value; and increase said rotational speed of said second rotor (17) in said first direction and decrease said rotational speed of said at least one second rotor (25) in said second direction, if said helicopter (1) must be turned in the same direction of said first torque (C1).

\* \* \* \* \*